United States Patent
Ansari et al.

(10) Patent No.: US 12,292,524 B2
(45) Date of Patent: May 6, 2025

(54) SECURED RANGING FOR NEIGHBOR AWARENESS NETWORKING DEVICES

(71) Applicant: QUALCOMM Incorporated, San Diego, CA (US)

(72) Inventors: Imran Ansari, Hyderabad (IN); Rajeev Kumar Singh, Hyderabad (IN); Prashant Harkude, Hyderabad (IN); Harbeer Singh, Hyderabad (IN); Shaikh Asfaquz Zaman, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 368 days.

(21) Appl. No.: 17/876,353

(22) Filed: Jul. 28, 2022

(65) Prior Publication Data
US 2024/0036148 A1    Feb. 1, 2024

(51) Int. Cl.
*H04W 8/00* (2009.01)
*G01S 5/00* (2006.01)
*H04W 24/10* (2009.01)

(52) U.S. Cl.
CPC ........... *G01S 5/0072* (2013.01); *H04W 8/005* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 10,342,013 B2* | 7/2019 | Yong | ...................... | H04W 72/20 |
| 11,317,405 B2* | 4/2022 | Yong | ...................... | H04W 76/14 |
| 2016/0165653 A1* | 6/2016 | Liu | ........... | H04W 72/12 370/329 |
| 2016/0309472 A1* | 10/2016 | Yong | ...................... | H04W 76/14 |
| 2018/0292522 A1* | 10/2018 | Cavendish | ............ | H04W 12/06 |
| 2019/0289603 A1* | 9/2019 | Yong | ...................... | H04W 72/20 |
| 2024/0036148 A1* | 2/2024 | Ansari | .................. | G01S 13/765 |

* cited by examiner

*Primary Examiner* — Faiyazkhan Ghafoerkhan
(74) *Attorney, Agent, or Firm* — Holland & Hart LLP

(57) ABSTRACT

Methods, systems, and devices for wireless communication are described. A first wireless device may establish a communication session with a second wireless device using a neighbor awareness networking (NAN) radio access technology (RAT). The first wireless device may transmit a first indication that the first wireless device is capable of using a secured ranging protocol. The first wireless device may receive a second indication that the second wireless device is also capable of using the secured ranging protocol. The first wireless device may determine one or more setup parameters to use for a ranging procedure between the first wireless device and the second wireless device based on the first indication and the second indication. Accordingly, the first wireless device may obtain a measurement report after using the secured ranging protocol to perform the ranging procedure in accordance with the one or more setup parameters.

26 Claims, 12 Drawing Sheets

SECURED RANGING FOR NEIGHBOR AWARENESS NETWORKING DEVICES

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless local access network (WLAN), such as a Wi-Fi (i.e., Institute of Electrical and Electronics Engineers (IEEE) 802.11) network, may include an access point (AP) that can communicate with one or more mobile devices. The AP may be coupled to a network (such as the Internet) and may enable a mobile device to communicate via the network (or with other devices coupled to the AP). A wireless device may communicate with a network device bi-directionally. For example, in a WLAN, a station (STA) may communicate with an associated AP via a downlink or an uplink. A downlink (or forward link) may refer to a communication link from the AP to the STA, while an uplink (or reverse link) may refer to a communication link from the STA to the AP.

In some wireless communications systems, a ranging procedure can be used to determine a distance between two wireless devices. In some cases, however, the wireless devices may exchange distance measurements (after performing the ranging procedure) using a non-secured protocol, which may increase the likelihood of data being tampered with or intercepted by other devices.

SUMMARY

The described techniques relate to methods, systems, devices, and apparatuses that support secured ranging for neighbor awareness networking (NAN) devices. The described techniques may improve the accuracy and security of ranging procedures between two wireless devices with NAN capabilities. In accordance with one or more aspects of the present disclosure, a first wireless device may establish a communication session with a second wireless device using a NAN radio access technology (RAT). The first wireless device may transmit a first indication that the first wireless device is capable of using a secured ranging protocol. The first wireless device may receive a second indication that the second wireless device is also capable of using the secured ranging protocol. The first wireless device may determine one or more setup parameters to use for a ranging procedure between the first wireless device and the second wireless device based on the first indication and the second indication. Accordingly, the first wireless device may obtain a measurement report after using the secured ranging protocol to perform the ranging procedure in accordance with the one or more setup parameters.

A method for wireless communication at a first wireless device is described. The method may include establishing a communication session with a second wireless device using a NAN RAT. The method may further include transmitting a first indication that the first wireless device is capable of using a secured ranging protocol. The method may further include receiving a second indication that the second wireless device is capable of using the secured ranging protocol. The method may further include determining one or more setup parameters to use for a ranging procedure between the first wireless device and the second wireless device based on the first indication and the second indication. The method may further include obtaining a measurement report based on using the secured ranging protocol to perform the ranging procedure in accordance with the one or more setup parameters.

An apparatus for wireless communication at a first wireless device is described. The apparatus may include a processor, memory coupled with the processor, and instructions stored in the memory. The instructions may be executable by the processor to cause the apparatus to establish a communication session with a second wireless device using a NAN RAT. The instructions may be further executable by the processor to cause the apparatus to transmit a first indication that the first wireless device is capable of using a secured ranging protocol. The instructions may be further executable by the processor to cause the apparatus to receive a second indication that the second wireless device is capable of using the secured ranging protocol. The instructions may be further executable by the processor to cause the apparatus to determine one or more setup parameters to use for a ranging procedure between the first wireless device and the second wireless device based on the first indication and the second indication. The instructions may be further executable by the processor to cause the apparatus to obtain a measurement report based on using the secured ranging protocol to perform the ranging procedure in accordance with the one or more setup parameters.

Another apparatus for wireless communication at a first wireless device is described. The apparatus may include means for establishing a communication session with a second wireless device using a NAN RAT. The apparatus may further include means for transmitting a first indication that the first wireless device is capable of using a secured ranging protocol. The apparatus may further include means for receiving a second indication that the second wireless device is capable of using the secured ranging protocol. The apparatus may further include means for determining one or more setup parameters to use for a ranging procedure between the first wireless device and the second wireless device based on the first indication and the second indication. The apparatus may further include means for obtaining a measurement report based on using the secured ranging protocol to perform the ranging procedure in accordance with the one or more setup parameters.

A non-transitory computer-readable medium storing code for wireless communication at a first wireless device is described. The code may include instructions executable by a processor to establish a communication session with a second wireless device using a NAN RAT. The instructions may be further executable by the processor to transmit a first indication that the first wireless device is capable of using a secured ranging protocol. The instructions may be further executable by the processor to receive a second indication that the second wireless device is capable of using the secured ranging protocol. The instructions may be further executable by the processor to determine one or more setup parameters to use for a ranging procedure between the first wireless device and the second wireless device based on the first indication and the second indication. The instructions may be further executable by the processor to obtain a measurement report based on using the secured ranging protocol to perform the ranging procedure in accordance with the one or more setup parameters.

In some examples of the methods, apparatuses, and non-transitory computer-readable media described herein, transmitting the first indication may include operations, features, means, or instructions for transmitting an indication of one or more ranging information element (IE) attributes within a service discovery frame (SDF), where the one or more ranging IE attributes include a ranging type field that indicates a capability of the first wireless device to use the secured ranging protocol.

In some examples of the methods, apparatuses, and non-transitory computer-readable media described herein, receiving the second indication may include operations, features, means, or instructions for receiving an indication of one or more ranging IE attributes within an SDF, where the one or more ranging IE attributes include a ranging type field that indicates a capability of the second wireless device to use the secured ranging protocol.

Some examples of the methods, apparatuses, and non-transitory computer-readable media described herein may further include operations, features, means, or instructions for determining that the second wireless device is capable of using a default ranging protocol or the secured ranging protocol based on a value of a ranging type field signaled in an SDF.

Some examples of the methods, apparatuses, and non-transitory computer-readable media described herein may further include operations, features, means, or instructions for determining the one or more setup parameters for the ranging procedure based on ranging capabilities of the first wireless device and the second wireless device.

Some examples of the methods, apparatuses, and non-transitory computer-readable media described herein may further include operations, features, means, or instructions for performing the ranging procedure with the second wireless device using the one or more setup parameters.

In some examples of the methods, apparatuses, and non-transitory computer-readable media described herein, the ranging capabilities of the first wireless device and the second wireless device may be signaled in an SDF.

Some examples of the methods, apparatuses, and non-transitory computer-readable media described herein may further include operations, features, means, or instructions for exchanging messages with the second wireless device in a ranging setup request (REQ) frame and a ranging setup response (RESP) frame, where the messages indicate the one or more setup parameters for the ranging procedure.

In some examples of the methods, apparatuses, and non-transitory computer-readable media described herein, the one or more setup parameters for the ranging procedure may be associated with the secured ranging protocol.

In some examples of the methods, apparatuses, and non-transitory computer-readable media described herein, the one or more setup parameters include a bandwidth for the ranging procedure, a puncturing mode for the ranging procedure, a set of NAN further availability window (FAW) slots for the ranging procedure, or a combination thereof.

In some examples of the methods, apparatuses, and non-transitory computer-readable media described herein, the bandwidth for the ranging procedure may be 160 megahertz (MHz), 240 MHz, or 320 MHz.

In some examples of the methods, apparatuses, and non-transitory computer-readable media described herein, the bandwidth for the ranging procedure may be associated with an extra high throughput (EHT) communication scheme or a high efficiency (HE) communication scheme.

In some examples of the methods, apparatuses, and non-transitory computer-readable media described herein, the bandwidth for the ranging procedure may be based on one or more device capability IEs signaled in an SDF.

In some examples of the methods, apparatuses, and non-transitory computer-readable media described herein, the puncturing mode for the ranging procedure includes a static puncturing mode or a dynamic puncturing mode.

In some examples of the methods, apparatuses, and non-transitory computer-readable media described herein, the measurement report indicates a distance measurement generated during the ranging procedure.

In some examples of the methods, apparatuses, and non-transitory computer-readable media described herein, the first wireless device may be a NAN initiator device and the second wireless device may be a NAN responder device.

In some examples of the methods, apparatuses, and non-transitory computer-readable media described herein, obtaining the measurement report may include operations, features, means, or instructions for transmitting an indication of the measurement report to the second wireless device using the secured ranging protocol.

In some examples of the methods, apparatuses, and non-transitory computer-readable media described herein, the second wireless device may be a NAN initiator device and the first wireless device may be a NAN responder device.

In some examples of the methods, apparatuses, and non-transitory computer-readable media described herein, obtaining the measurement report may include operations, features, means, or instructions for receiving an indication of the measurement report from the second wireless device using the secured ranging protocol.

DETAILED DESCRIPTION

Figure 1:
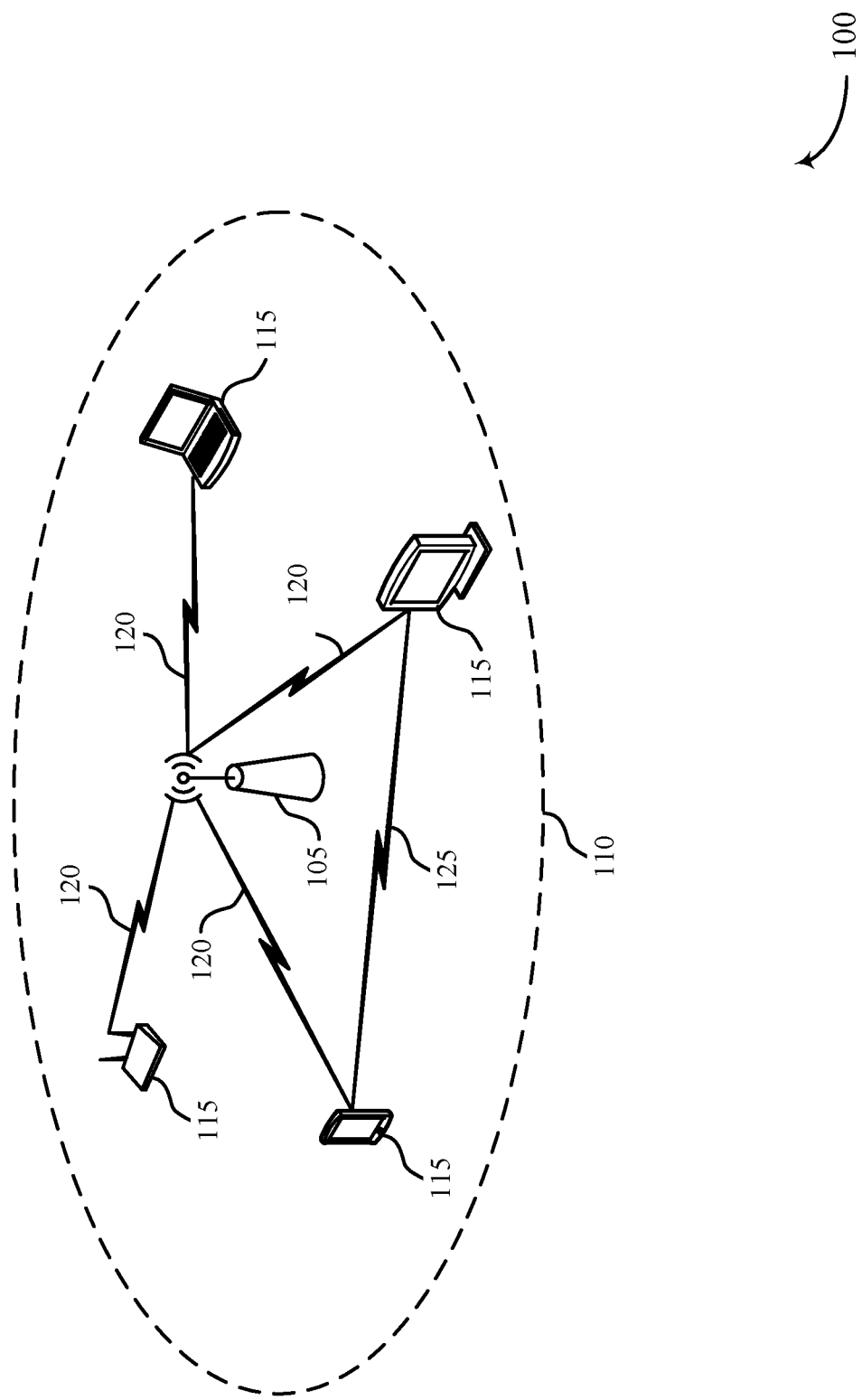
FIGS. 1 and 2 illustrate examples of wireless communications systems that support secured ranging for neighbor awareness networking (NAN) devices in accordance with one or more aspects of the present disclosure.

In some wireless communications systems, devices may communicate using a Wi-Fi radio access technology (RAT). Some Wi-Fi devices may have neighbor awareness networking (NAN) capabilities that enable these devices (equivalently referred to as NAN devices or Wi-Fi Aware devices) to autonomously discover and communicate with other Wi-Fi devices in a peer-to-peer (P2P) network. NAN devices can connect and exchange data without a network infrastructure, internet connection, or global positioning system (GPS) signal. NAN devices can use a ranging mechanism to estimate a distance between the NAN devices. Prior to setting up a ranging procedure, NAN devices may exchange (indicate, advertise) various ranging information element (IE) attributes in a service discovery frame (SDF).

After the SDF exchange, the NAN devices may jointly configure various settings (bandwidth, puncturing mode, further availability window (FAW) slots) for the ranging procedure. Accordingly, the NAN devices may perform the ranging procedure and exchange measurement reports (distance estimates) after the ranging procedure is complete. However, NAN devices may be limited to using a default Fine Time Measurement (FTM) protocol for ranging procedures. Since this default protocol (e.g., an 802.11mc-based ranging mechanism) is non-secured, other devices can intercept or tamper with measurement reports from the NAN devices. Furthermore, the default ranging protocol may have a maximum bandwidth of 80 megahertz (MHz), which may limit the accuracy of distance estimates obtained using the default ranging protocol.

In accordance with aspects of the present disclosure, NAN devices may use larger bandwidths (up to 320 MHz) and a secured ranging protocol (e.g., an 802.11az-based ranging mechanism) for ranging procedures. NAN devices may indicate support for the default ranging protocol or the secured ranging protocol via a ranging type bit in the ranging IE attributes that are exchanged during an SDF. If a NAN device supports both the secured ranging protocol and the default ranging protocol, the NAN device may set the ranging type bit to a first value. Otherwise, the NAN device may set the ranging type bit to a second value. Once two NAN devices have established a communication session and exchanged capability information (in one or more SDFs), the NAN devices can use the secured ranging protocol to generate and exchange measurement reports in a secure manner.

In some examples, the NAN devices may jointly determine a bandwidth to use for the ranging procedure by exchanging messages during a ranging request (REQ) frame and a ranging response (RESP) frame. If both NAN devices support the secure ranging protocol, the NAN devices can use a larger bandwidth (240 MHz, 320 MHz) for the ranging procedure, thereby enabling the NAN devices to generate distance estimates with greater precision. The NAN devices may also determine a maximum burst duration, a puncturing mode, ranging control parameters, FTM parameters, FAW slots, physical layer (PHY) frame formats, and other setup attributes for the ranging procedure during the ranging REQ frame and the ranging RESP frame.

Aspects of the present disclosure may be implemented to realize one or more of the following advantages. The described techniques may improve the accuracy and security of ranging procedures between NAN devices by enabling the NAN devices to utilize a secured ranging protocol. For example, if two NAN devices both indicate support for the secured ranging protocol (within the ranging IE attributes of an SDF), the NAN devices can use the secured ranging protocol to setup and perform a subsequent ranging procedure. Using the secured ranging protocol (instead of a non-secured default ranging protocol) may reduce the likelihood of transmissions from the NAN devices (measurement reports) being tampered with or intercepted by other devices. Moreover, NAN devices that support secured ranging can use larger ranging bandwidths (240 MHz, 320 MHz), which may enable the NAN devices to obtain more accurate distance estimates, among other benefits.

Aspects of the disclosure are initially described in the context of wireless communications systems, flowcharts, and process flows. Aspects of the disclosure are further illustrated by and described with reference to apparatus diagrams, system diagrams, and flowcharts that relate to secured ranging for NAN devices.

FIG. 1 illustrates a wireless communications system 100 (also known as a Wi-Fi network) configured in accordance with various aspects of the present disclosure. The wireless communications system 100 may include an AP 105 and multiple associated STAs 115, which may represent devices such as mobile STAs, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the wireless communications system 100. An extended network station (not shown) associated with the wireless communications system 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communications system 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for PHY and medium access control (MAC) layers from IEEE 802.11 and versions including, but not limited to, 802.11b, 802.11g, 802.11a, 802.11n, 802.11ac, 802.11ad, 802.11ah, 802.11ax, 802.11az, 802.11mc, 802.11be, etc. In other implementations, peer-to-peer connections or ad hoc networks may be implemented within the wireless communications system 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment because the STAs 115 may not refrain from transmitting on top of each other. A STA 115 whose transmissions are not identifiable, but that is within the same coverage area 110 may be known as a hidden node. Carrier-sense multiple access (CSMA) with collision avoidance (CA) may be supplemented by the exchange of a request to send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some wireless communications systems, a Wi-Fi Aware (also referred to as NAN) ranging mechanism can be used for indoor positioning in a P2P network. This Wi-Fi Aware ranging protocol enables NAN devices to advertise (signal, indicate) ranging capabilities in one or more SDFs during a discovery process. Peer NAN devices (equivalently referred to herein as Wi-Fi Aware devices or wireless devices) can establish a ranging session and measure the distance between the peer NAN devices using a default FTM-based ranging protocol. Wi-Fi Aware ranging procedures may include a first message exchange (discovery and ranging service) and a second message exchange (distance measurement) between two peer NAN devices. Distance estimates can be forwarded to an application after each ranging measurement.

In accordance with the techniques described herein, a first NAN device may establish a communication session with a second NAN device. Once the communication session is established, the first NAN device may transmit a first indication that the first NAN device is capable of using a secured ranging protocol. The first NAN device may then receive a second indication that the second NAN device also supports the secured ranging protocol. The first NAN device may determine one or more setup parameters to use for a ranging procedure between the first NAN device and the second NAN device based on the first indication and the second indication. Accordingly, the first NAN device may obtain a measurement report after using the secured ranging protocol to perform the ranging procedure in accordance with the one or more setup parameters.

Aspects of the wireless communications system 100 may be implemented to realize one or more of the following advantages. The techniques described with reference to FIG. 1 may improve the accuracy and security of ranging procedures between NAN devices by enabling the NAN devices to utilize a secured ranging protocol. For example, if two NAN devices both indicate support for the secured ranging protocol (within the ranging IE attributes of an SDF), the NAN devices can use the secured ranging protocol to setup and perform a ranging procedure. Using the secured ranging protocol (instead of a non-secured default ranging protocol) may reduce the likelihood of transmissions from the NAN devices being tampered with or intercepted by other devices. Moreover, NAN devices that support secured ranging can use larger ranging bandwidths (240 MHz, 320 MHz), which may enable the NAN devices to obtain more accurate distance estimates, among other benefits.

Figure 2:
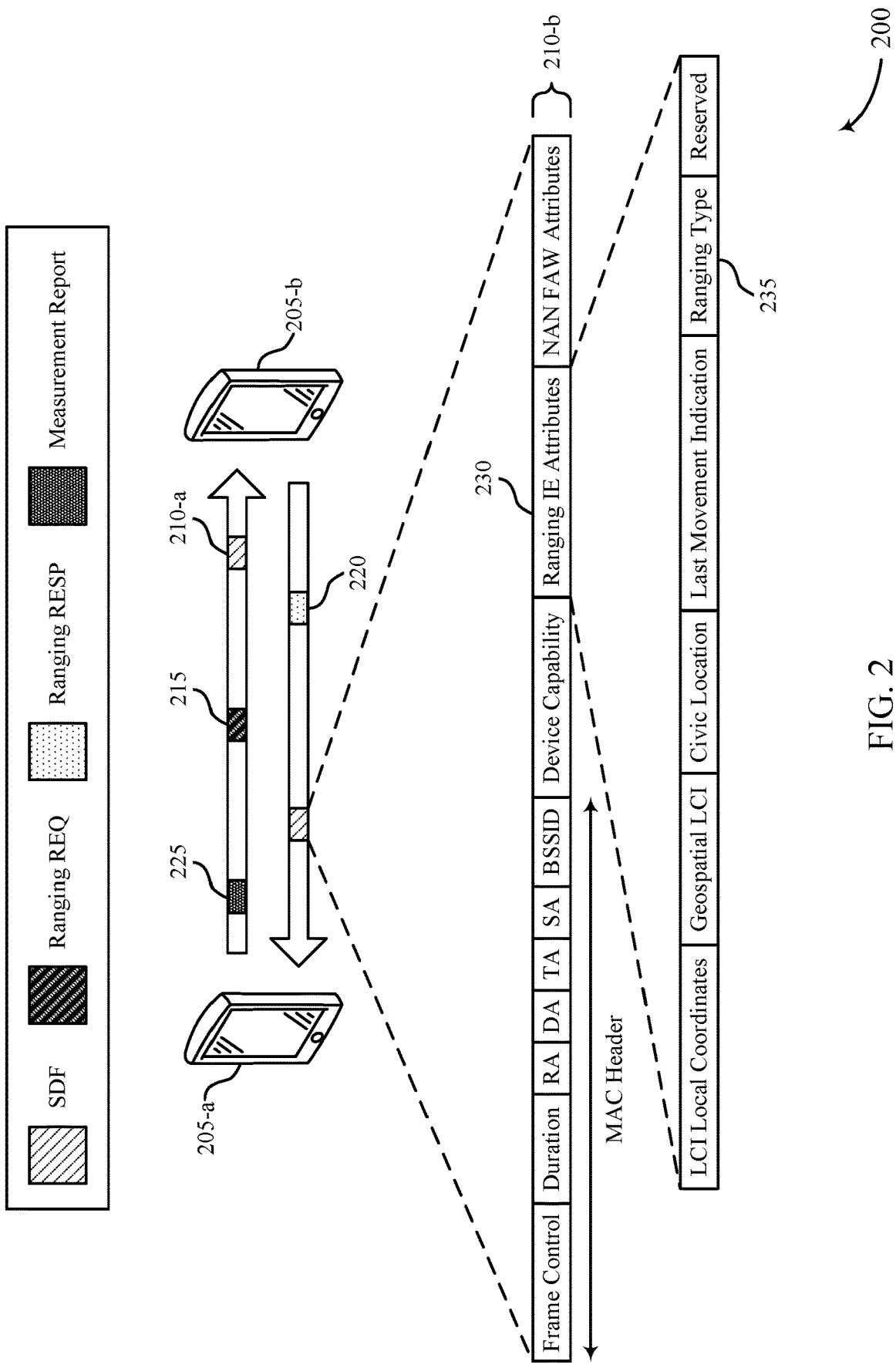

FIG. 2 illustrates an example of a wireless communications system 200 that supports secured ranging for NAN devices in accordance with one or more aspects of the present disclosure. The wireless communications system 200 may implement or be implemented by aspects of wireless communications system 100. For example, the wireless communications system 200 may include a wireless device 205-a (a first NAN device) and a wireless device 205-b (a second NAN device), which may be examples of a STA 115 described with reference to FIG. 1. In the wireless communications system 200, the wireless devices 205 may use NAN (also referred to as Wi-Fi Aware) to autonomously establish a communication session. Once connected, the wireless devices 205 may setup and perform a NAN ranging procedure using a secured ranging protocol.

In some wireless communications systems, the wireless devices 205 may be configured to use a default ranging mechanism for indoor positioning. In NAN ranging procedures, the wireless device 205-b (a publisher NAN device) serves as a responder and the wireless device 205-a (a subscriber NAN device) serves as an initiator for the NAN ranging procedure. The wireless devices 205 may indicate support for different ranging capabilities during a service discovery process, and may determine ranging setup attributes (FAW slots for FTM) based on the indicated ranging capabilities. The wireless devices 205 may then perform an FTM-based frame exchange, generate a ranging report, and share the report to a ranging application. However, conventional NAN ranging mechanisms may only support a default FTM-based ranging protocol and a maximum bandwidth of 80 MHz (which may limit the accuracy of NAN ranging procedures).

The wireless devices 205 may exchange SDFs 210 prior to initiating a ranging session. As illustrated in the example of FIG. 2, each of the SDFs 210 may include frame control information, a duration field, a receiver address (RA), a destination address (DA), a transmitter address (TA), a source address (SA), a basic service set identifier (BSSID), device capability information, ranging IE attributes 230, and NAN FAW attributes. The frame control information and the duration field may each include 2 octets, while the RA, DA, TA, SA, and BSSID may each include 6 octets. The device capability information may include 9 octets, the ranging IE attributes may include 1 octet, and the NAN FAW attributes may include 51 octets. The frame control information, duration field, RA, DA, TA, SA, and BSSID may collectively form a MAC header.

The wireless devices 205 can indicate supported ranging capabilities via the ranging IE attributes 230. More specifically, ranging IE attributes 230 in an SDF 210-a may indicate ranging capabilities of the wireless device 205-a, while ranging IE attributes 230 in the SDF 210-b may indicate ranging capabilities of the wireless device 205-b. The ranging IE attributes 230 may include a location configuration information (LCI) local coordinate field, a geospatial LCI field, a civic location information field, a last movement indication field, and one or more reserved bits (bits 5-7). For the LCI local coordinate field, the geospatial LCI field, the civic location information field, and the last movement indication field, a first value (0) may indicate a first state (false, not present), while a second value (1) may indicate a second state (true, present).

If both of the wireless devices 205 have ranging capabilities, the wireless devices 205 may use a default FTM-based protocol for ranging sessions. Using this default protocol, the wireless devices 205 may exchange ranging signaling in an open (non-secured) mode. The NAN device serving as the responder (the wireless device 205-a) may advertise ranging capabilities in the SDF 210-b. Accordingly, the NAN device serving as the subscriber or initiator (the wireless device 205-a) may configure a ranging procedure and measure the distance between the responder and the initiator. The NAN devices (responder and initiator) may then jointly determine ranging setup attributes (ranging control, FTM parameters, FAW slots) for the ranging procedure by exchanging messages in a ranging REQ frame 215 and a ranging RESP frame 220.

The ranging control attribute (1 byte) may indicate whether FTM Parameters and NAN FAW slots are present. The ranging control attribute may also indicate whether an FTM measurement report is required for the responder. Other NAN FTM parameters may include a maximum burst duration, FTM frames (in each burst), PHY frame format information, and FTM frame bandwidth. After an FTM burst frame exchange, the wireless device 205-a (the NAN initiator) may send a measurement report 225 (an FTM range report) to one or both of the wireless device 205-b (the NAN Responder) or an application that requests NAN ranging measurements. Some secured positioning and ranging signaling mechanisms may support bandwidths of 160 MHz, 240 MHz, and 320 MHz. Extending such mechanisms to NAN ranging may improve the accuracy and security of ranging sessions between NAN devices.

In accordance with aspects of the present disclosure, the ranging IE attributes 230 may be updated to include a ranging type field 235. If the ranging type field 235 is set to a first value (0), the wireless devices 205 may use a default (non-secured) FTM-based protocol for ranging procedures. If the ranging type field is set to a second value (1), the wireless devices 205 may use a secured protocol for ranging protocol. For example, if both of the wireless devices 205 indicate support for secured ranging (via the ranging type field 235), the wireless devices 205 may perform a secure frame exchange and exchange distance measurements in a secure mode. If both of the wireless devices 205 indicate support for secured ranging, the wireless devices 205 can also use a larger ranging bandwidth (160 MHz, 240 MHz, 320 MHz) for ranging sessions, which may enable the wireless devices 205 to attain more precise distance measurements.

Figure 3:
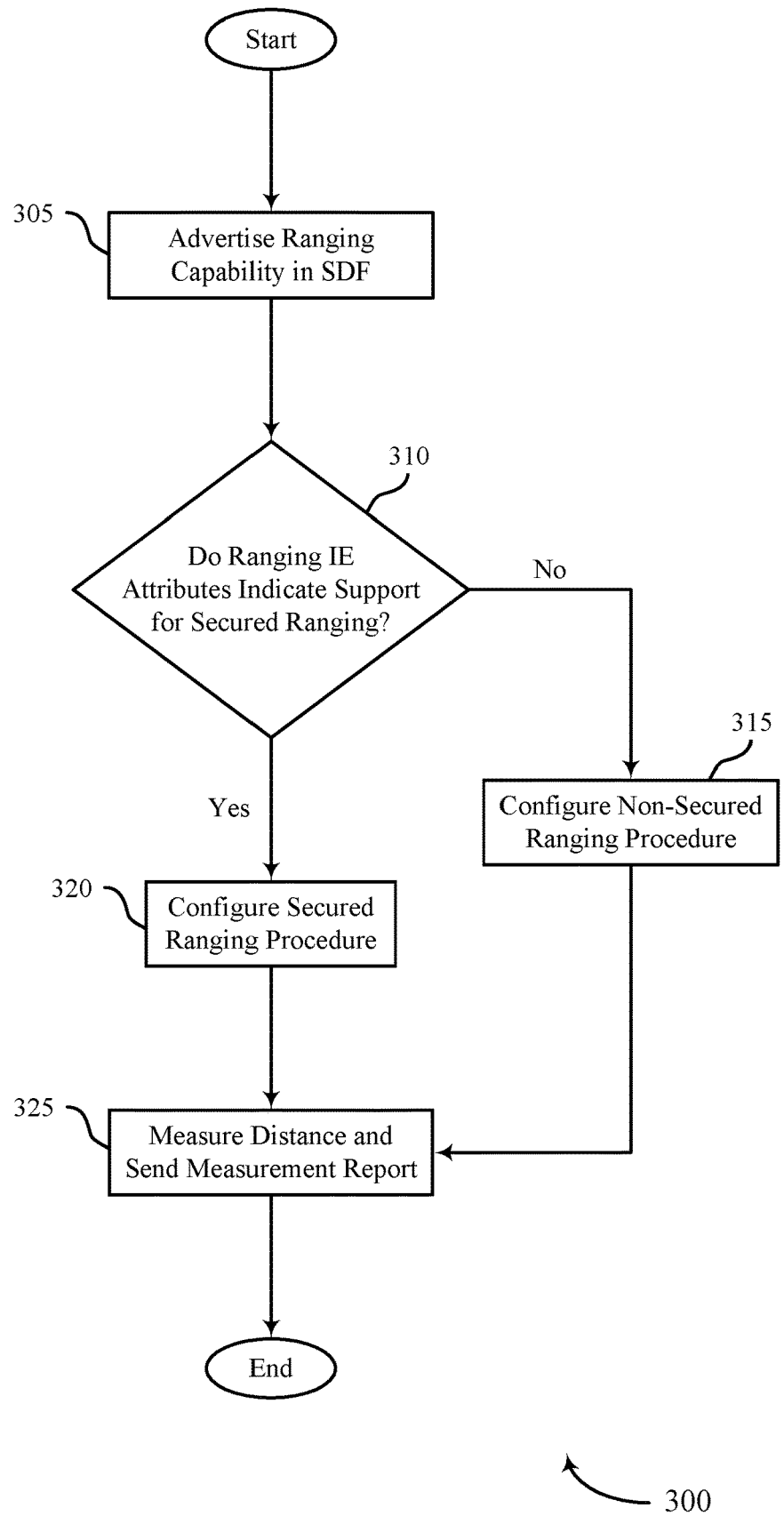
FIG. 3 illustrates an example of a flowchart that supports secured ranging for NAN devices in accordance with one or more aspects of the present disclosure.

FIG. 3 illustrates an example of a flowchart 300 that supports secured ranging for NAN devices in accordance with one or more aspects of the present disclosure. The flowchart 300 may implement or be implemented by aspects of the wireless communications system 100 or the wireless communications system 200. For example, the flowchart 300 may be implemented by a wireless device 205 or a STA 115 described with reference to FIGS. 1 and 2. The flowchart 300 illustrates a procedure for setting up a secured ranging session between two NAN devices. Some of the exemplary operations depicted in the example of FIG. 3 may be omitted or performed in a different order (with respect to the exemplary order shown). Additionally or alternatively, some operations may be added to the flowchart 300.

At 305, a first NAN device (a NAN initiator) and a second NAN device (a NAN responder) may advertise ranging capabilities during an SDF exchange. At 310, the NAN devices may determine whether both NAN devices support a secured ranging signaling mechanism based on one or more ranging IE attributes (e.g., the ranging IE attributes 230 described with reference to FIG. 2) signaled during the SDF exchange. If both NAN devices indicate support for the secured ranging signaling mechanism, the NAN devices may configure a secured ranging procedure at 320. Otherwise, the NAN devices may configure a non-secured ranging procedure (using a default FTM-based protocol) at 315. At 325, the NAN initiator may measure a ranging distance and update the measured distance to a requested application or the peer NAN responder device.

The secured ranging signaling mechanism may support a high efficiency (HE) bandwidth of 160 MHz for some operating modes. Other extra high throughput (EHT) bandwidths (320 MHz, 240 MHz) can also be used to provide greater ranging accuracy. NAN devices can select ranging mechanisms and ranging bandwidths during a NAN ranging setup procedure by signaling various ranging setup attributes in a ranging REQ frame and a ranging RESP frame. The secured ranging signaling mechanism may support static and dynamic puncturing modes and EHT ranging bandwidths that are defined in the NAN ranging setup procedure. Peer NAN devices (initiator and responder) can indicate support for secured ranging in an SDF exchange.

As described with reference to FIG. 2, NAN devices can use a bit in the ranging IE attributes of an SDF to indicate support for secured ranging. In some examples, this bit (also referred to herein as a ranging type bit or a ranging type field) may be the fourth bit in the ranging IE attributes octet of the SDF. If this bit is set to a second value (1), a secured positioning mechanism may be used for NAN ranging procedures. Alternatively, if this bit is set to a first value (0), a default (non-secured) FTM-based positioning mechanism may be used for NAN ranging procedures. If both NAN devices are capable of using secured positioning, the NAN devices can set up a NAN ranging session using the secured positioning mechanism (equivalently referred to as a secured ranging protocol).

The ranging setup REQ and RESP frames may configure NAN FAW slots, puncturing modes, secure HE long training fields (LTFs), and other parameters to be used for a secure NAN ranging session. These parameters can be embedded into the NAN setup REQ and RESP frames, as described herein. The NAN devices may select an EHT bandwidth (240 MHz, 320 MHz) or a HE bandwidth (160 MHz) for the secured NAN ranging session based on device capability IEs signaled in an SDF. After performing a secured frame exchange (using the selected bandwidth), the NAN initiator can send the resulting measurement report to the NAN responder. Additionally or alternatively, the NAN initiator can add a request for NAN ranging after the secure ranging exchange process.

Using an EHT ranging bandwidth of 320 MHz may enhance the accuracy of ranging measurements performed by NAN devices. Using a secured ranging protocol may also result in improved user privacy and security, as ranging measurements are exchanged in a secured mode. Moreover, using a secured ranging signaling mechanisms may reduce the likelihood of man-in-the-middle (MITM) and denial of service (DOS) attacks without third party hardware like ultra-wideband (UWB) for secured ranging. Secured ranging is used in various mobile, automobile, IoT, and UWB applications. Thus, maintaining a high level of security and accuracy for secured ranging is desirable for many reasons. NAN ranging mechanisms have relatively low costs, and can be used across a large number of Wi-Fi sub-systems without additional ranging hardware.

Figure 4:
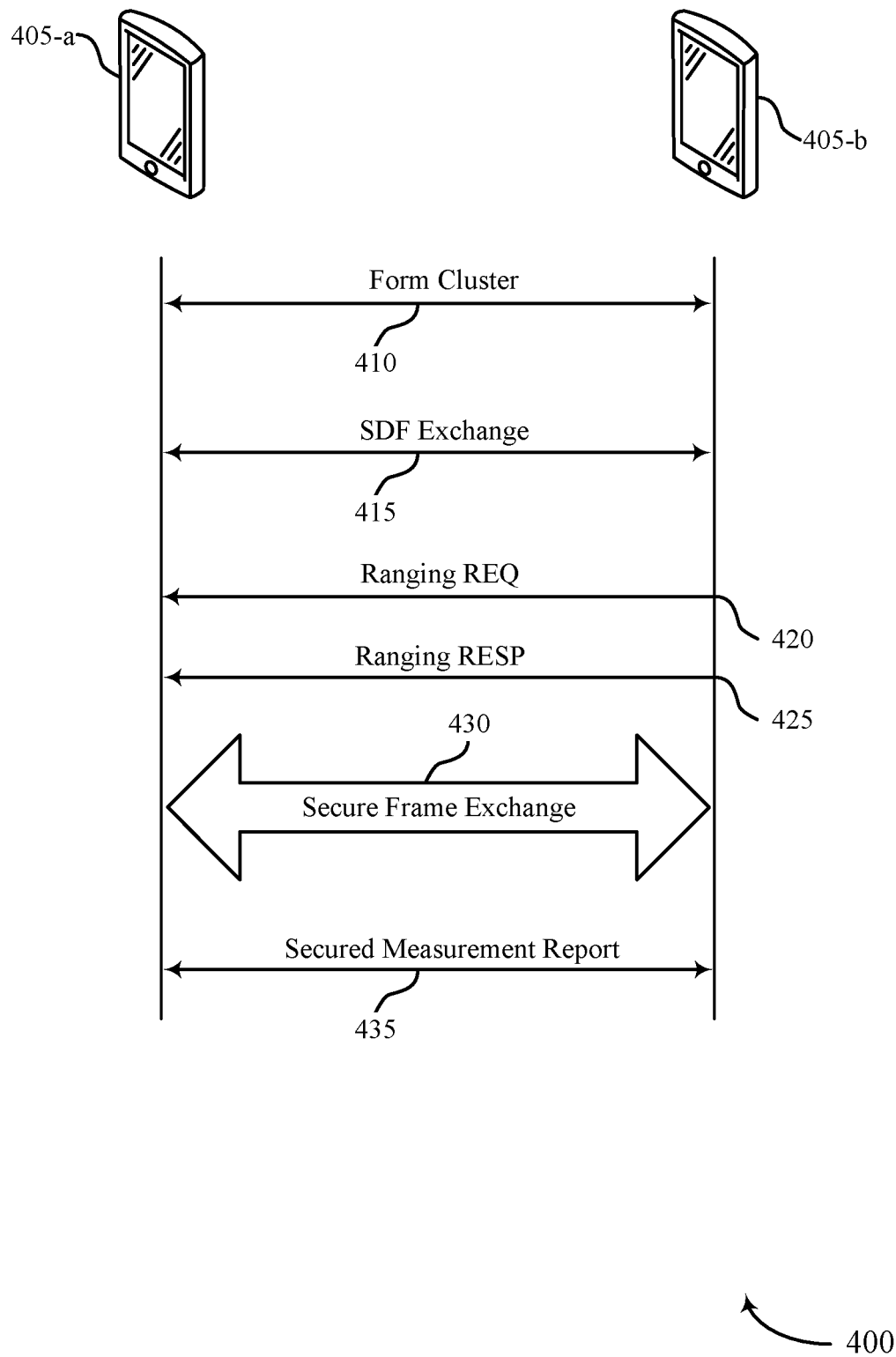
FIG. 4 illustrates an example of a process flow that supports secured ranging for NAN devices in accordance with one or more aspects of the present disclosure.

FIG. 4 illustrates an example of a process flow 400 that supports secured ranging for NAN devices in accordance with one or more aspects of the present disclosure. The process flow 400 may implement or be implemented by aspects of the wireless communications system 100, the wireless communications system 200, or the flowchart 300. For example, the process flow 400 may include a wireless device 405-*a* (a first NAN device) and a wireless device 405-*b* (a second NAN device), which may be examples of corresponding devices described with reference to FIGS. 1 through 3. In the following description of the process flow 400, operations between the wireless devices 405 may be added, omitted, or performed in a different order (with respect to the exemplary order shown). In the example of FIG. 4, the wireless devices 405 may use a secured ranging protocol to perform a NAN ranging procedure.

At 410, the wireless device 405-*a* may establish a communication session with the wireless device 405-*b* by forming a 2.4 GHz or 5 GHz cluster. At 415, the wireless device 405-*a* (a NAN initiator) and the wireless device 405-*b* (a NAN responder) may perform an SDF exchange. During this exchange, the wireless devices 405 may signal respective ranging IE attributes (e.g., the ranging IE attributes 230 described with reference to FIG. 2) that indicate ranging capabilities of the wireless devices 405. The ranging IE attributes may include a ranging type field (e.g., the ranging type field 235 described with reference to FIG. 2) that indicates whether the wireless devices 405 support a secured ranging protocol or a default (non-secured) FTM-based ranging protocol for NAN ranging procedures. If the ranging type field is set to a first value (0), the wireless devices 405 may use the default ranging protocol for a subsequent ranging session. If the ranging type field is set to a second value (1), the wireless devices may use the secured ranging protocol for the subsequent ranging session.

At 420, the wireless device 405-b may transmit an indication of one or more secure setup attributes (also referred to as setup parameters) within a ranging REQ frame. Likewise, the wireless device 405-a may transmit an indication of one or more secure setup attributes within a ranging RESP frame at 425. The secure setup attributes signaled in the ranging REQ frame and the ranging RESP frame may be based on device capability IEs signaled in the SDF exchange. The secure setup attributes may include a ranging bandwidth, a puncturing mode (static or dynamic), NAN FAW slot information, secure HE-LTFs, and various other NAN ranging setup parameters. In some examples, the ranging bandwidth may be associated with an EHT communication scheme (240 MHz, 320 MHz) or a HE communication scheme (160 MHz).

At 430, the wireless devices 405 may use the secured ranging protocol to perform a secure frame exchange in accordance with the secure setup attributes. At 435, the wireless device 405-a may send a measurement report (e.g., the measurement report 225 described with reference to FIG. 2) to the wireless device 405-b (a peer NAN device) or a ranging application. The measurement report may indicate a ranging estimate (approximate distance) between the wireless device 405-a and the wireless device 405-b. The wireless device 405-a may transmit the measurement report in a secure mode (using the secured ranging protocol) to reduce the likelihood of other devices tampering with or intercepting the measurement report.

Aspects of the process flow 400 may be implemented to realize one or more of the following advantages. The techniques described with reference to FIG. 4 may improve the accuracy and security of ranging procedures between the wireless devices 405 (NAN devices) by enabling the wireless devices 405 to utilize a secured ranging protocol for NAN ranging sessions. For example, if both of the wireless devices 405 indicate support for the secured ranging protocol during the SDF exchange at 415, the wireless devices 405 can use the secured ranging protocol to acquire and exchange ranging measurements. Using a secured ranging protocol (instead of a non-secured default ranging protocol) may reduce the likelihood of the wireless devices 405 experiencing DoS or MITM attacks. Moreover, the wireless devices 405 can use larger bandwidths (240 MHz, 320 MHz) for secured ranging procedures, which may enable the wireless devices 405 to obtain more accurate distance measurements.

Figure 5:
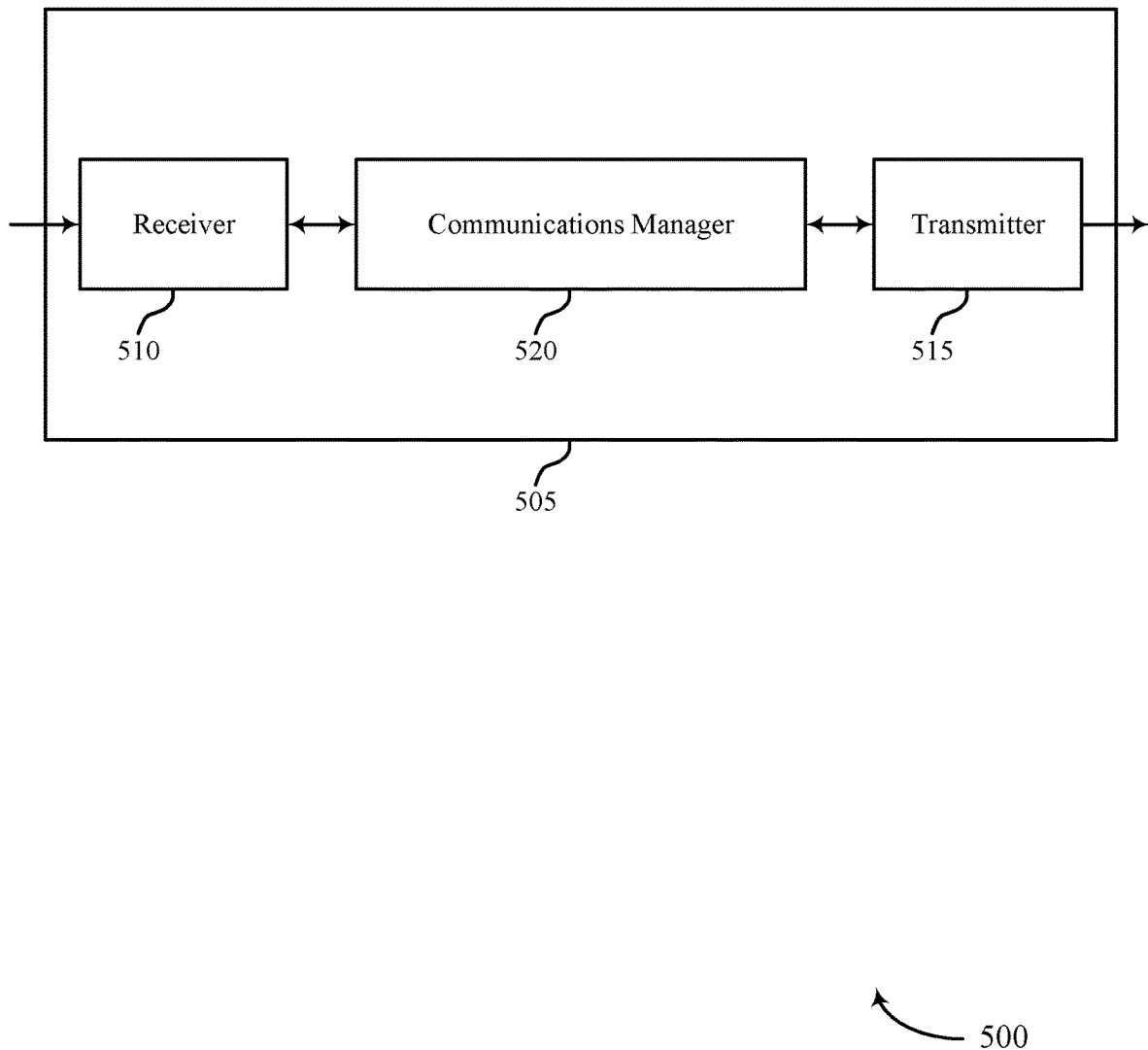
FIGS. 5 and 6 show block diagrams of devices that support secured ranging for NAN devices in accordance with one or more aspects of the present disclosure.

FIG. 5 shows a block diagram 500 of a device 505 that supports secured ranging for NAN devices in accordance with one or more aspects of the present disclosure. The device 505 may be an example of aspects of a wireless device 205 or a wireless device 405, as described herein with reference to FIGS. 2 and 4. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to secured ranging for NAN devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to secured ranging for NAN devices). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of secured ranging for NAN devices as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first wireless device in accordance with examples disclosed herein. For example, the communications manager 520 may be configured as or otherwise support a means for establishing a communication session with a second wireless device using a NAN RAT. The communications manager 520 may be configured as or otherwise support a means for transmitting a first indication that the first wireless device is capable of using a secured ranging protocol. The communications manager 520 may be configured as or otherwise support a means for receiving a second indication that the second wireless device is capable of using the secured ranging protocol. The communications manager 520 may be configured as or otherwise support a means for determining one or more setup parameters to use for a ranging procedure between the first wireless device and the second wireless device based on the first indication and the second indication. The communications manager 520 may be configured as or otherwise support a means for obtaining a measurement report based on using the secured ranging protocol to perform the ranging procedure in accordance with the one or more setup parameters.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources by enabling the device 505 to use larger bandwidths (up to 320 MHz) for secured NAN ranging sessions.

Figure 6:
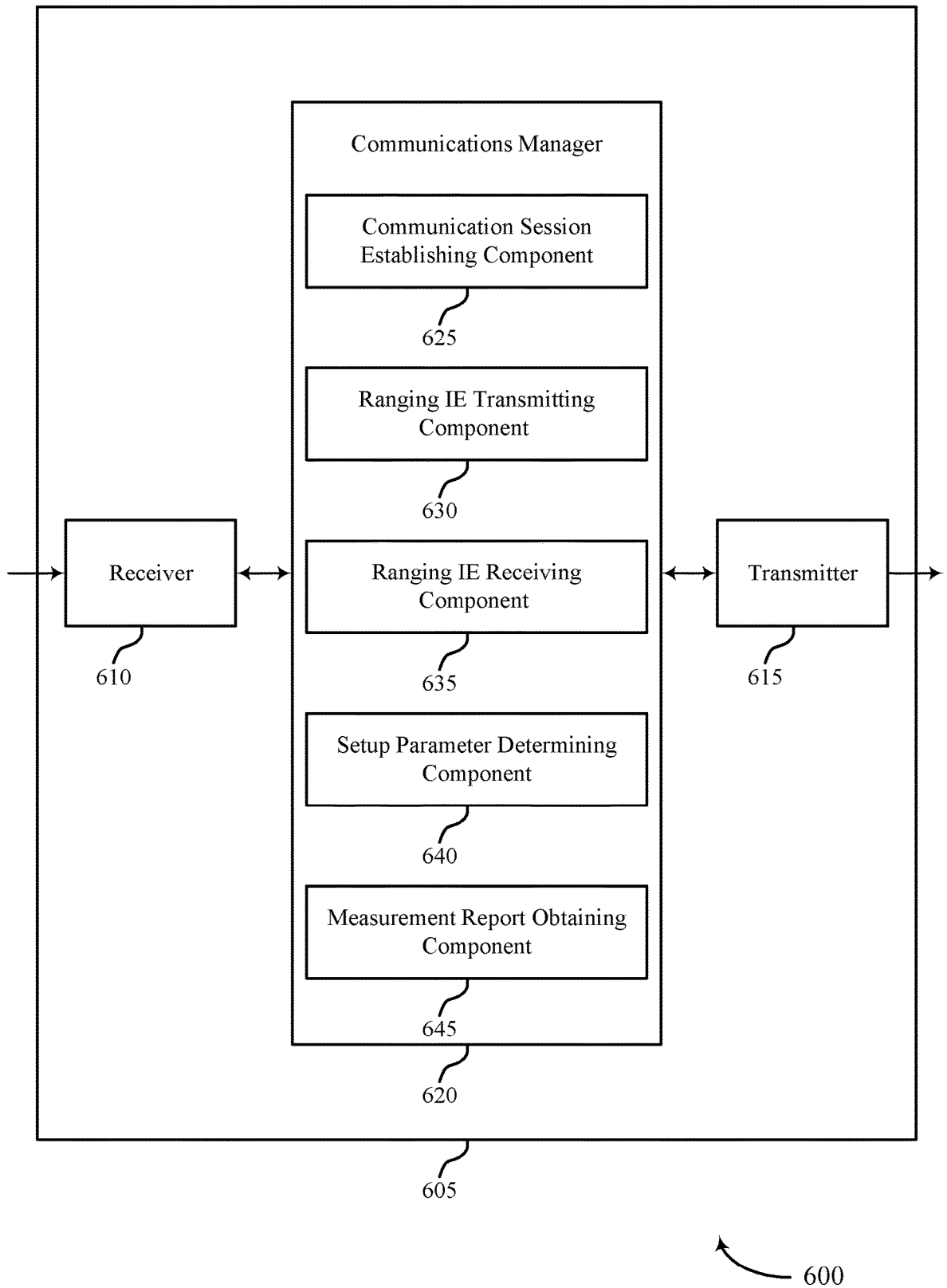

FIG. 6 shows a block diagram 600 of a device 605 that supports secured ranging for NAN devices in accordance with one or more aspects of the present disclosure. The device 605 may be an example of aspects of a wireless device 205, a wireless device 405, or a device 505, as described herein with reference to FIGS. 2 through 5. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to secured ranging for NAN devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to secured ranging for NAN devices). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of secured ranging for NAN devices as described herein. For example, the communications manager 620 may include a communication session establishing component 625, a ranging IE transmitting component 630, a ranging IE receiving component 635, a setup parameter determining component 640, a measurement report obtaining component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless device in accordance with examples disclosed herein. The communication session establishing component 625 may be configured as or otherwise support a means for establishing a communication session with a second wireless device using a NAN RAT. The ranging IE transmitting component 630 may be configured as or otherwise support a means for transmitting a first indication that the first wireless device is capable of using a secured ranging protocol. The ranging IE receiving component 635 may be configured as or otherwise support a means for receiving a second indication that the second wireless device is capable of using the secured ranging protocol. The setup parameter determining component 640 may be configured as or otherwise support a means for determining one or more setup parameters to use for a ranging procedure between the first wireless device and the second wireless device based on the first indication and the second indication. The measurement report obtaining component 645 may be configured as or otherwise support a means for obtaining a measurement report based on using the secured ranging protocol to perform the ranging procedure in accordance with the one or more setup parameters.

Figure 7:
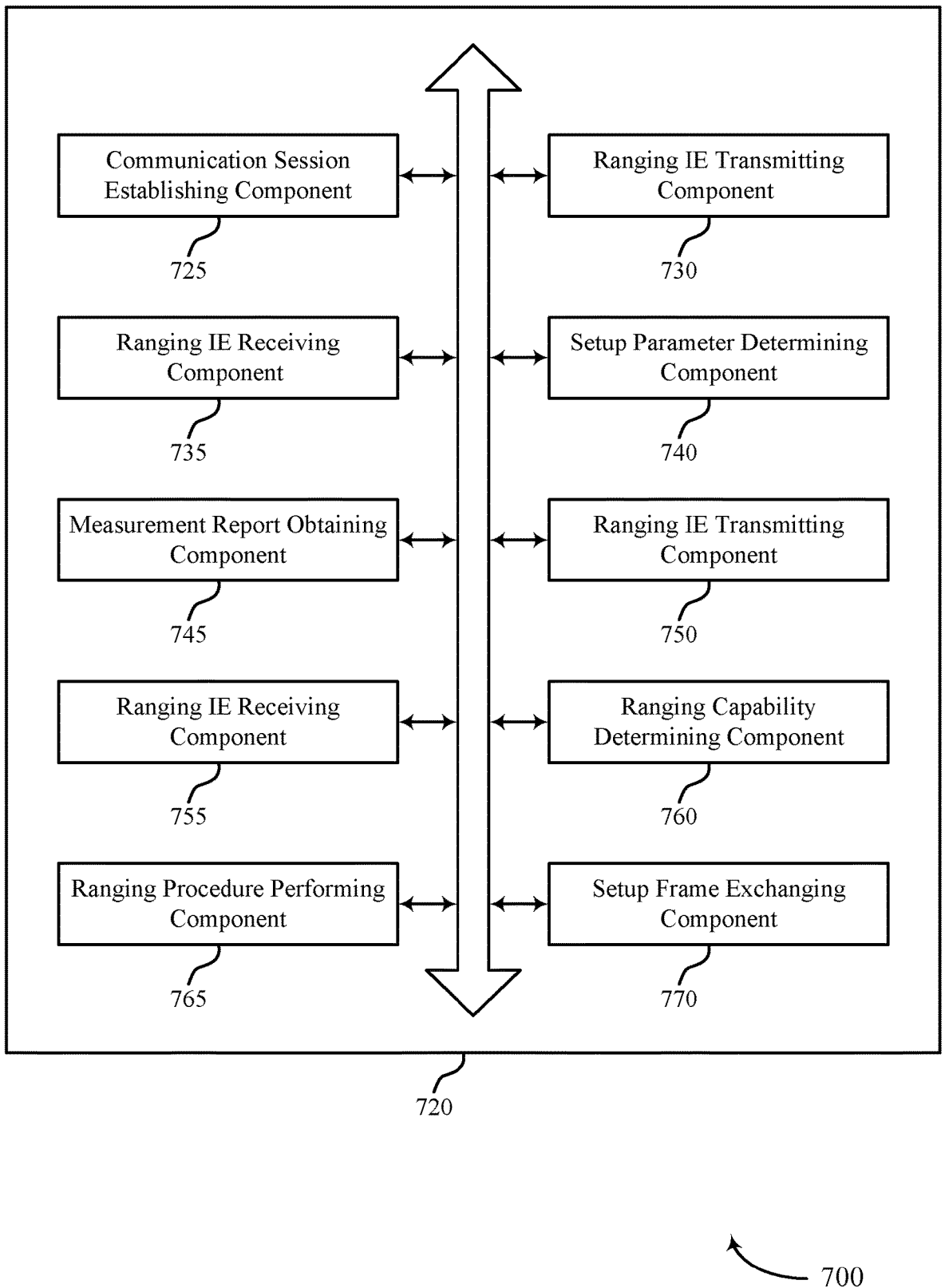
FIG. 7 shows a block diagram of a communications manager that supports secured ranging for NAN devices in accordance with one or more aspects of the present disclosure.

FIG. 7 shows a block diagram 700 of a communications manager 720 that supports secured ranging for NAN devices in accordance with one or more aspects of the present disclosure. The communications manager 720 may be an example of aspects of a communications manager 520, a communications manager 620, or both, as described herein. The communications manager 720, or various components thereof, may be an example of means for performing various aspects of secured ranging for NAN devices as described herein. For example, the communications manager 720 may include a communication session establishing component 725, a ranging IE transmitting component 730, a ranging IE receiving component 735, a setup parameter determining component 740, a measurement report obtaining component 745, a ranging IE transmitting component 750, a ranging IE receiving component 755, a ranging capability determining component 760, a ranging procedure performing component 765, a setup frame exchanging component 770, or any combination thereof. Each of these components may communicate, directly or indirectly, with one another (e.g., via one or more buses).

The communications manager 720 may support wireless communication at a first wireless device in accordance with examples disclosed herein. The communication session establishing component 725 may be configured as or otherwise support a means for establishing a communication session with a second wireless device using a NAN RAT. The ranging IE transmitting component 730 may be configured as or otherwise support a means for transmitting a first indication that the first wireless device is capable of using a secured ranging protocol. The ranging IE receiving component 735 may be configured as or otherwise support a means for receiving a second indication that the second wireless device is capable of using the secured ranging protocol. The setup parameter determining component 740 may be configured as or otherwise support a means for determining one or more setup parameters to use for a ranging procedure between the first wireless device and the second wireless device based on the first indication and the second indication. The measurement report obtaining component 745 may be configured as or otherwise support a means for obtaining a measurement report based on using the secured ranging protocol to perform the ranging procedure in accordance with the one or more setup parameters.

In some examples, to support transmitting the first indication, the ranging IE transmitting component 750 may be configured as or otherwise support a means for transmitting an indication of one or more ranging IE attributes within an SDF, where the one or more ranging IE attributes include a ranging type field that indicates a capability of the first wireless device to use the secured ranging protocol.

In some examples, to support receiving the second indication, the ranging IE receiving component 755 may be configured as or otherwise support a means for receiving an indication of one or more ranging IE attributes within an SDF, where the one or more ranging IE attributes include a ranging type field that indicates a capability of the second wireless device to use the secured ranging protocol.

In some examples, the ranging capability determining component 760 may be configured as or otherwise support a means for determining that the second wireless device is capable of using a default ranging protocol or the secured ranging protocol based on a value of a ranging type field signaled in an SDF.

In some examples, the setup parameter determining component 740 may be configured as or otherwise support a means for determining the one or more setup parameters for the ranging procedure based on ranging capabilities of the first wireless device and the second wireless device. In some examples, the ranging procedure performing component 765 may be configured as or otherwise support a means for performing the ranging procedure with the second wireless device using the one or more setup parameters. In some examples, the ranging capabilities of the first wireless device and the second wireless device are signaled in an SDF.

In some examples, the setup frame exchanging component 770 may be configured as or otherwise support a means for exchanging messages with the second wireless device in a ranging setup REQ frame and a ranging setup RESP frame, where the messages indicate the one or more setup parameters for the ranging procedure.

In some examples, the one or more setup parameters for the ranging procedure are associated with the secured ranging protocol. In some examples, the one or more setup parameters include a bandwidth for the ranging procedure, a puncturing mode for the ranging procedure, a set of NAN FAW slots for the ranging procedure, or a combination thereof.

In some examples, the bandwidth for the ranging procedure is 160 MHz, 240 MHz, or 320 MHz. In some examples, the bandwidth for the ranging procedure is associated with an EHT communication scheme or a HE communication scheme. In some examples, the bandwidth for the ranging procedure is based on one or more device capability IEs signaled in an SDF. In some examples, the puncturing mode for the ranging procedure includes a static puncturing mode or a dynamic puncturing mode. In some examples, the measurement report indicates a distance measurement generated during the ranging procedure.

In some examples, the first wireless device is a NAN initiator device and the second wireless device is a NAN responder device. In some examples, to support obtaining the measurement report, the measurement report obtaining component 745 may be configured as or otherwise support a means for transmitting an indication of the measurement report to the second wireless device using the secured ranging protocol.

In some examples, the second wireless device is a NAN initiator device and the first wireless device is a NAN responder device. In some examples, to support obtaining the measurement report, the measurement report obtaining component 745 may be configured as or otherwise support a means for receiving an indication of the measurement report from the second wireless device using the secured ranging protocol.

Figure 8:
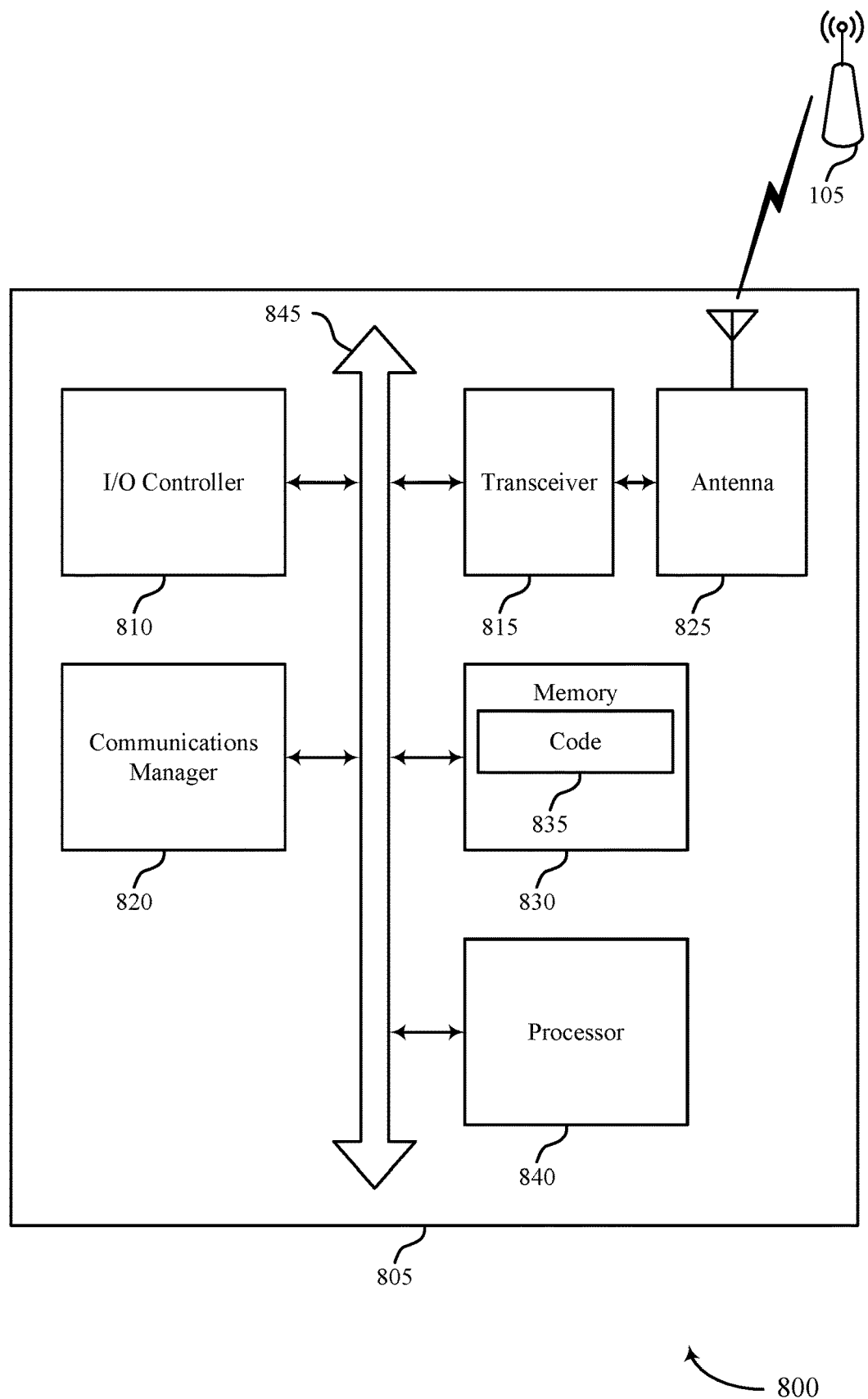
FIG. 8 shows a diagram of a system including a device that supports secured ranging for NAN devices in accordance with one or more aspects of the present disclosure.

FIG. 8 shows a diagram of a system 800 including a device 805 that supports secured ranging for NAN devices in accordance with one or more aspects of the present disclosure. The device 805 may be an example of or include the components of a device 505, a device 605, or a wireless device as described herein. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In some other cases, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets and provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting secured ranging for NAN devices). For example, the device 805 or a component of the device 805 may include a processor 840 and memory 830 coupled with or to the processor 840, the processor 840 and memory 830 configured to perform various functions described herein.

The communications manager 820 may support wireless communication at a first wireless device in accordance with examples disclosed herein. For example, the communications manager 820 may be configured as or otherwise support a means for establishing a communication session with a second wireless device using a NAN RAT. The communications manager 820 may be configured as or otherwise support a means for transmitting a first indication that the first wireless device is capable of using a secured ranging protocol. The communications manager 820 may be configured as or otherwise support a means for receiving a second indication that the second wireless device is capable of using the secured ranging protocol. The communications manager 820 may be configured as or otherwise support a means for determining one or more setup parameters to use for a ranging procedure between the first wireless device and the second wireless device based on the first indication and the second indication. The communications manager 820 may be configured as or otherwise support a means for obtaining a measurement report based on using the secured ranging protocol to perform the ranging procedure in accordance with the one or more setup parameters.

By including or configuring the communications manager 820 in accordance with examples as described herein, the device 805 may support techniques for improving the accuracy and security of ranging procedures between the device 805 and a peer NAN device by enabling the device 805 to utilize a secured ranging protocol for NAN ranging sessions. For example, if the device 805 and the peer NAN device both indicate support for the secured ranging protocol during an SDF exchange, the device 805 can use the secured ranging protocol to securely exchange ranging measurements with the peer NAN device. Using a secured ranging protocol (instead of a non-secured default ranging protocol) may reduce the likelihood of the device 805 experiencing DoS or MITM attacks. Moreover, the device 805 can use larger bandwidths (240 MHz, 320 MHz) for secured ranging procedures, which may enable the device 805 to obtain more accurate distance measurements.

Figure 9:
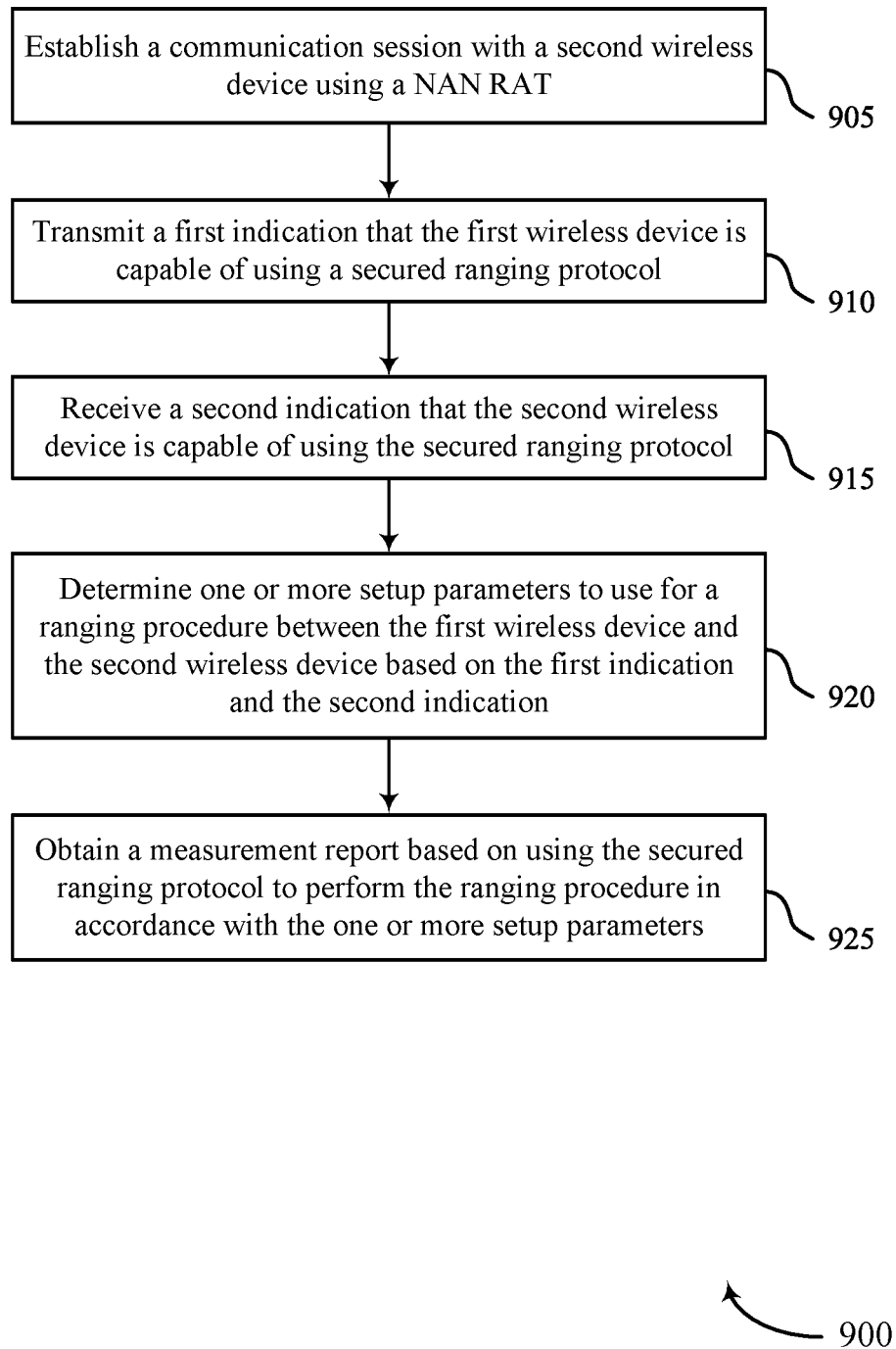
FIGS. 9 through 12 show flowcharts illustrating methods that support secured ranging for NAN devices in accordance with one or more aspects of the present disclosure.

FIG. 9 shows a flowchart illustrating a method 900 that supports secured ranging for NAN devices in accordance with one or more aspects of the present disclosure. Aspects of the method 900 may be implemented by a wireless device or components thereof. For example, operations of the method 900 may be performed by a wireless device 205 or a wireless device 405, as described with reference to FIGS. 2 and 4. In some examples, a wireless device may execute a set of instructions to control the functional elements of the wireless device to perform the described functions. Additionally, or alternatively, a wireless device may perform aspects of the described functions using special-purpose hardware.

At 905, a first wireless device may establish communication session with a second wireless device using a NAN RAT. The operations of 905 may be performed in accordance with examples disclosed herein. In some examples, the operations of 905 may be performed by a communication session establishing component 725, as described with reference to FIG. 7.

At 910, the first wireless device may transmit a first indication that the first wireless device is capable of using a secured ranging protocol. The operations of 910 may be performed in accordance with examples disclosed herein. In some examples, the operations of 910 may be performed by a ranging IE transmitting component 730, as described with reference to FIG. 7.

At 915, the first wireless device may receive a second indication that the second wireless device is capable of using the secured ranging protocol. The operations of 915 may be performed in accordance with examples disclosed herein. In some examples, the operations of 915 may be performed by a ranging IE receiving component 735, as described with reference to FIG. 7.

At 920, the first wireless device may determine one or more setup parameters to use for a ranging procedure between the first wireless device and the second wireless device based on the first indication and the second indication. The operations of 920 may be performed in accordance with examples disclosed herein. In some examples, the operations of 920 may be performed by a setup parameter determining component 740, as described with reference to FIG. 7.

At 925, the first wireless device may obtain a measurement report based on using the secured ranging protocol to perform the ranging procedure in accordance with the one or more setup parameters. The operations of 925 may be performed in accordance with examples disclosed herein. In some examples, the operations of 925 may be performed by a measurement report obtaining component 745, as described with reference to FIG. 7.

Figure 10:
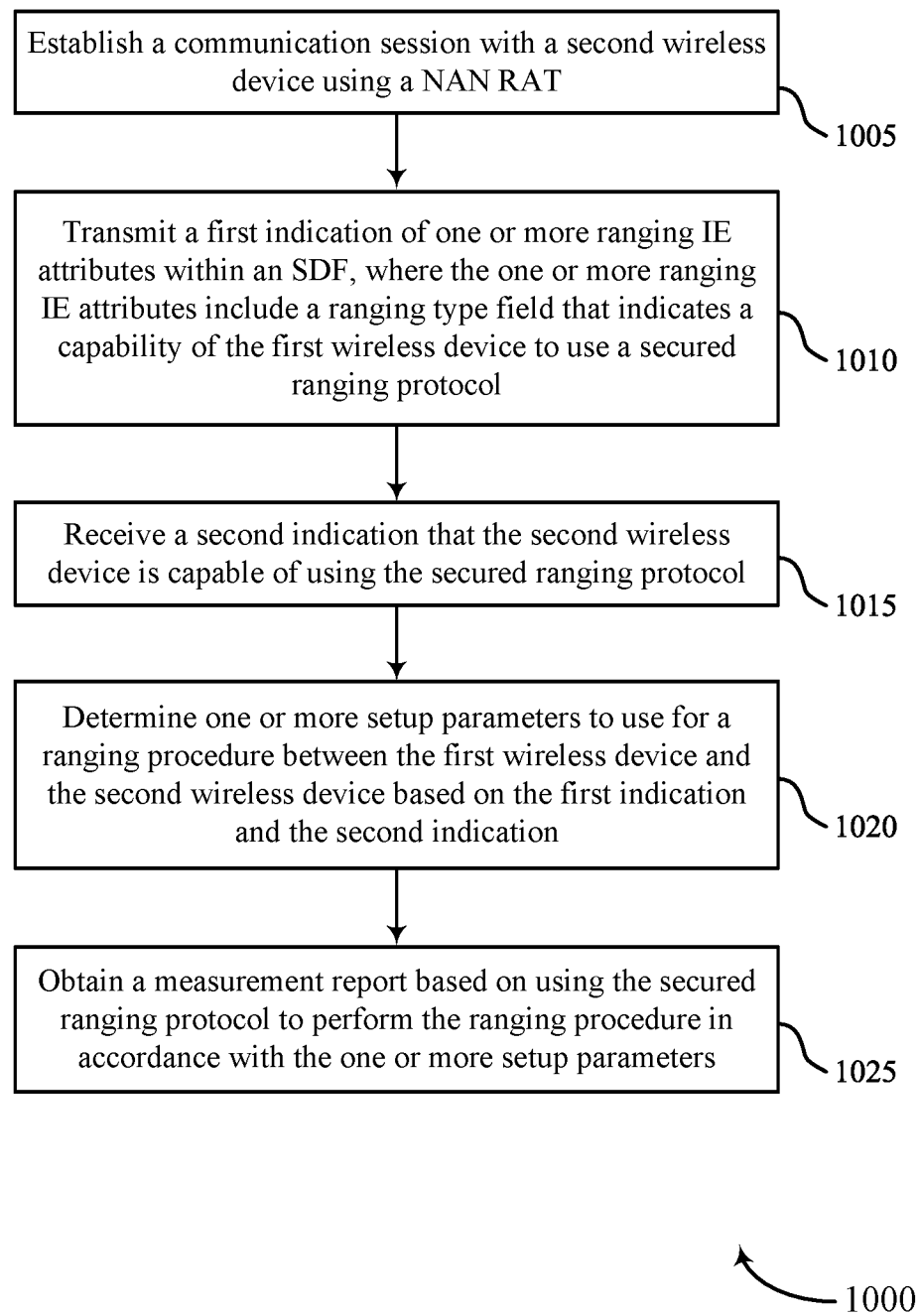

FIG. 10 shows a flowchart illustrating a method 1000 that supports secured ranging for NAN devices in accordance with one or more aspects of the present disclosure. Aspects of the method 1000 may be implemented by a wireless device or components thereof. For example, operations of the method 1000 may be performed by a wireless device 205 or a wireless device 405, as described with reference to FIGS. 2 and 4. In some examples, a wireless device may execute a set of instructions to control the functional elements of the wireless device to perform the described functions. Additionally, or alternatively, a wireless device may perform aspects of the described functions using special-purpose hardware.

At 1005, a first wireless device may establish a communication session with a second wireless device using a NAN RAT. The operations of 1005 may be performed in accordance with examples disclosed herein. In some examples, the operations of 1005 may be performed by a communication session establishing component 725, as described with reference to FIG. 7.

At 1010, the first wireless device may transmit a first indication of one or more ranging IE attributes within an SDF, where the one or more ranging IE attributes include a ranging type field that indicates a capability of the first wireless device to use a secured ranging protocol. The operations of 1010 may be performed in accordance with examples disclosed herein. In some examples, the operations of 1010 may be performed by a ranging IE transmitting component 750, as described with reference to FIG. 7.

At 1015, the first wireless device may receive a second indication that the second wireless device is capable of using the secured ranging protocol. The operations of 1015 may be performed in accordance with examples disclosed herein. In some examples, the operations of 1015 may be performed by a ranging IE receiving component 735, as described with reference to FIG. 7.

At 1020, the first wireless device may determine one or more setup parameters to use for a ranging procedure between the first wireless device and the second wireless device based on the first indication and the second indication. The operations of 1020 may be performed in accordance with examples disclosed herein. In some examples, the operations of 1020 may be performed by a setup parameter determining component 740, as described with reference to FIG. 7.

At 1025, the first wireless device may obtain a measurement report based on using the secured ranging protocol to perform the ranging procedure in accordance with the one or more setup parameters. The operations of 1025 may be performed in accordance with examples disclosed herein. In some examples, the operations of 1025 may be performed by a measurement report obtaining component 745, as described with reference to FIG. 7.

Figure 11:
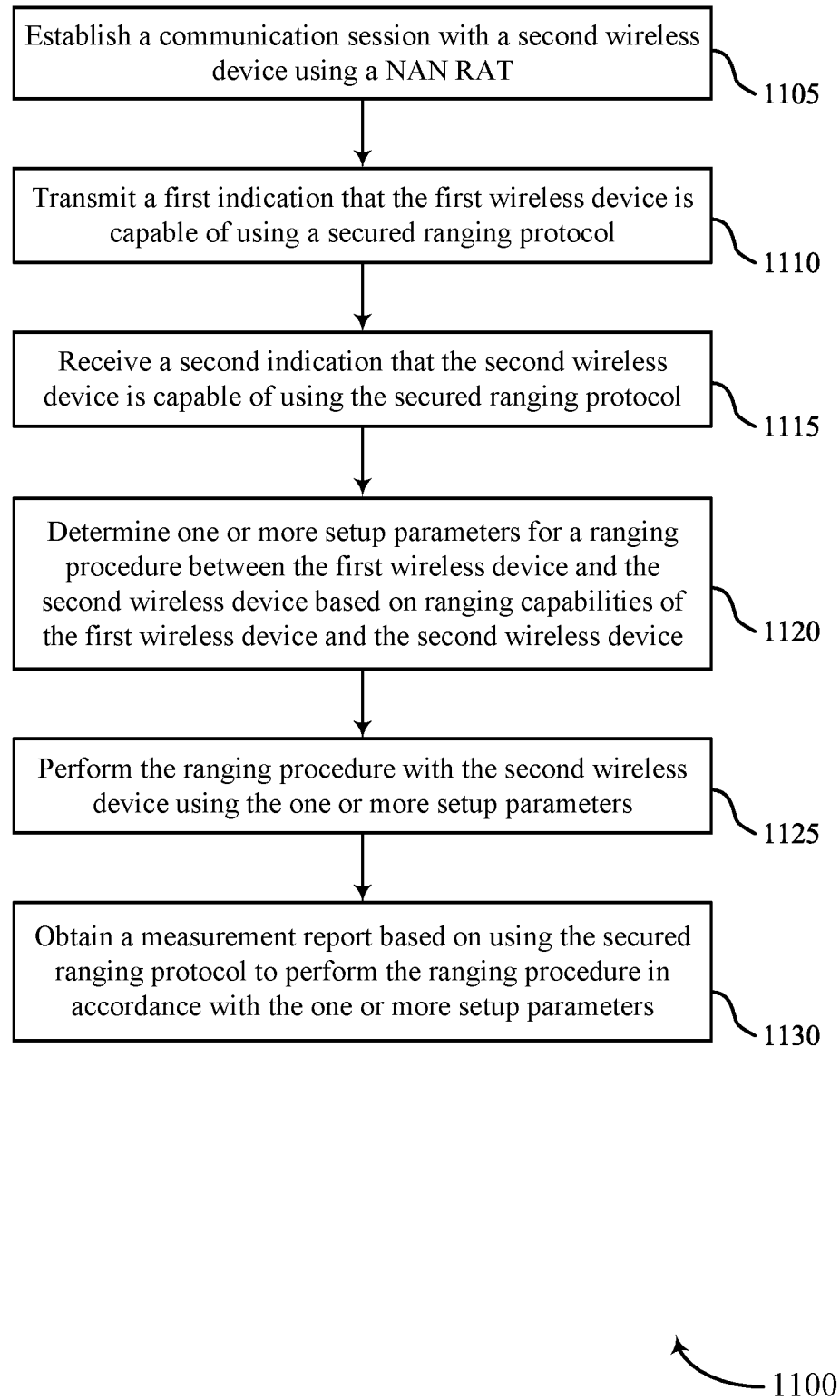

FIG. 11 shows a flowchart illustrating a method 1100 that supports secured ranging for NAN devices in accordance with one or more aspects of the present disclosure. Aspects of the method 1100 may be implemented by a wireless device or components thereof. For example, operations of the method 1100 may be performed by a wireless device 205 or a wireless device 405, as described with reference to FIGS. 2 and 4. In some examples, a wireless device may execute a set of instructions to control the functional elements of the wireless device to perform the described functions. Additionally, or alternatively, a wireless device may perform aspects of the described functions using special-purpose hardware.

At 1105, a first wireless device may establish a communication session with a second wireless device using a NAN RAT. The operations of 1105 may be performed in accordance with examples disclosed herein. In some examples, the operations of 1105 may be performed by a communication session establishing component 725, as described with reference to FIG. 7.

At 1110, the first wireless device may transmit a first indication that the first wireless device is capable of using a secured ranging protocol. The operations of 1110 may be performed in accordance with examples disclosed herein. In some examples, the operations of 1110 may be performed by a ranging IE transmitting component 730, as described with reference to FIG. 7.

At 1115, the first wireless device may receive a second indication that the second wireless device is capable of using the secured ranging protocol. The operations of 1115 may be performed in accordance with examples disclosed herein. In some examples, the operations of 1115 may be performed by a ranging IE receiving component 735, as described with reference to FIG. 7.

At 1120, the first wireless device may determine one or more setup parameters to use for a ranging procedure between the first wireless device and the second wireless device based on ranging capabilities of the first wireless device and the second wireless device. The operations of 1120 may be performed in accordance with examples disclosed herein. In some examples, the operations of 1120 may be performed by a setup parameter determining component 740, as described with reference to FIG. 7.

At 1125, the first wireless device may perform the ranging procedure with the second wireless device using the one or more setup parameters. The operations of 1125 may be performed in accordance with examples disclosed herein. In some examples, the operations of 1125 may be performed by a ranging procedure performing component 765, as described with reference to FIG. 7.

At 1130, the first wireless device may obtain a measurement report based on using the secured ranging protocol to perform the ranging procedure in accordance with the one or more setup parameters. The operations of 1130 may be performed in accordance with examples disclosed herein. In some examples, the operations of 1130 may be performed by a measurement report obtaining component 745, as described with reference to FIG. 7.

Figure 12:
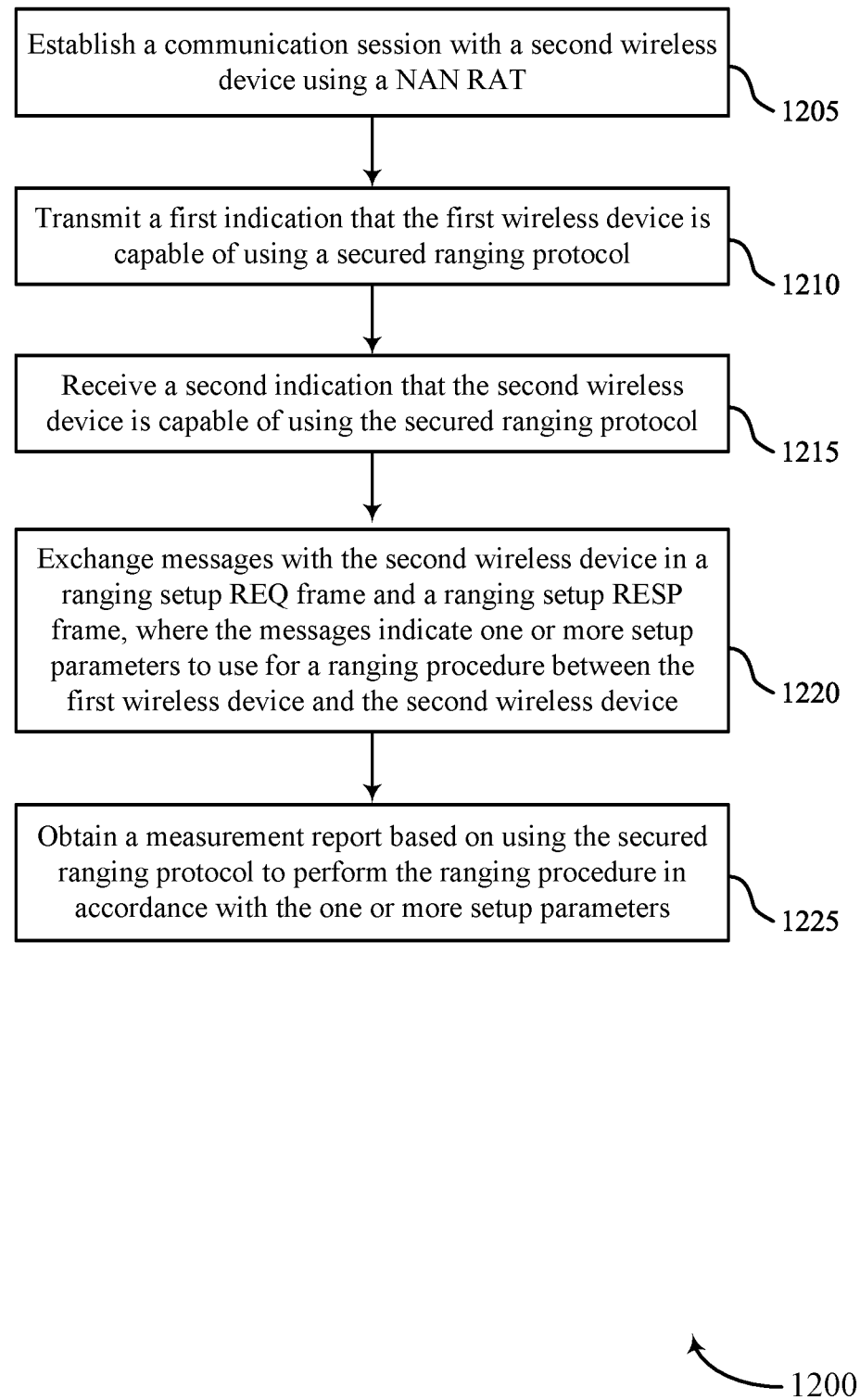

FIG. 12 shows a flowchart illustrating a method 1200 that supports secured ranging for NAN devices in accordance with one or more aspects of the present disclosure. Aspects of the method 1200 may be implemented by a wireless device or components thereof. For example, the operations of the method 1200 may be performed by a wireless device 205 or a wireless device 405, as described with reference to FIGS. 2 and 4. In some examples, a wireless device may execute a set of instructions to control the functional elements of the wireless device to perform the described functions. Additionally, or alternatively, a wireless device may perform aspects of the described functions using special-purpose hardware.

At 1205, a first wireless device may establish a communication session with a second wireless device using a NAN RAT. The operations of 1205 may be performed in accordance with examples disclosed herein. In some examples, the operations of 1205 may be performed by a communication session establishing component 725, as described with reference to FIG. 7.

At 1210, the first wireless device may transmit a first indication that the first wireless device is capable of using a secured ranging protocol. The operations of 1210 may be performed in accordance with examples disclosed herein. In some examples, the operations of 1210 may be performed by a ranging IE transmitting component 730, as described with reference to FIG. 7.

At 1215, the first wireless device may receive a second indication that the second wireless device is capable of using the secured ranging protocol. The operations of 1215 may be performed in accordance with examples disclosed herein. In some examples, the operations of 1215 may be performed by a ranging IE receiving component 735, as described with reference to FIG. 7.

At 1220, the first wireless device may exchange messages with the second wireless device in a ranging setup REQ frame and a ranging setup RESP frame, where the messages indicate one or more setup parameters to use for a ranging procedure between the first wireless device and the second wireless device. The operations of 1220 may be performed in accordance with examples disclosed herein. In some examples, the operations of 1220 may be performed by a setup parameter determining component 740, as described with reference to FIG. 7.

At 1225, the first wireless device may obtain a measurement report based on using the secured ranging protocol to perform the ranging procedure in accordance with the one or more setup parameters. The operations of 1225 may be performed in accordance with examples disclosed herein. In some examples, the operations of 1225 may be performed by a measurement report obtaining component 745, as described with reference to FIG. 7.

The following provides an overview of aspects of the present disclosure:

Aspect 1: A method for wireless communication at a first wireless device, comprising: establishing a communication session with a second wireless device using a neighbor awareness networking radio access technology; transmitting a first indication that the first wireless device is capable of using a secured ranging protocol; receiving a second indication that the second wireless device is capable of using the secured ranging protocol; determining one or more setup parameters to use for a ranging procedure between the first wireless device and the second wireless device based at least in part on the first indication and the second indication; and obtaining a measurement report based at least in part on using the secured ranging protocol to perform the ranging procedure in accordance with the one or more setup parameters.

Aspect 2: The method of aspect 1, wherein transmitting the first indication comprises: transmitting an indication of one or more ranging information element attributes within a service discovery frame, wherein the one or more ranging information element attributes comprise a ranging type field that indicates a capability of the first wireless device to use the secured ranging protocol.

Aspect 3: The method of any of aspects 1 through 2, wherein receiving the second indication comprises: receiving an indication of one or more ranging information element attributes within a service discovery frame, wherein the one or more ranging information element attributes comprise a ranging type field that indicates a capability of the second wireless device to use the secured ranging protocol.

Aspect 4: The method of any of aspects 1 through 3, further comprising: determining that the second wireless device is capable of using a default ranging protocol or the secured ranging protocol based at least in part on a value of a ranging type field signaled in a service discovery frame.

Aspect 5: The method of any of aspects 1 through 4, further comprising: determining the one or more setup parameters for the ranging procedure based at least in part on ranging capabilities of the first wireless device and the second wireless device; and performing the ranging procedure with the second wireless device using the one or more setup parameters.

Aspect 6: The method of aspect 5, wherein the ranging capabilities of the first wireless device and the second wireless device are signaled in a service discovery frame.

Aspect 7: The method of any of aspects 1 through 6, further comprising: exchanging messages with the second wireless device in a ranging setup request frame and a ranging setup response frame, wherein the messages indicate the one or more setup parameters for the ranging procedure.

Aspect 8: The method of any of aspects 1 through 7, wherein the one or more setup parameters for the ranging procedure are associated with the secured ranging protocol.

Aspect 9: The method of any of aspects 1 through 8, wherein the one or more setup parameters comprise a bandwidth for the ranging procedure, a puncturing mode for the ranging procedure, a set of neighbor awareness networking further availability window slots for the ranging procedure, or a combination thereof.

Aspect 10: The method of aspect 9, wherein the bandwidth for the ranging procedure is 160 megahertz, 240 megahertz, or 320 megahertz.

Aspect 11: The method of any of aspects 9 through 10, wherein the bandwidth for the ranging procedure is associated with an extra high throughput communication scheme or a high efficiency communication scheme.

Aspect 12: The method of any of aspects 9 through 11, wherein the bandwidth for the ranging procedure is based at least in part on one or more device capability information elements signaled in a service discovery frame.

Aspect 13: The method of any of aspects 9 through 12, wherein the puncturing mode for the ranging procedure comprises a static puncturing mode or a dynamic puncturing mode.

Aspect 14: The method of any of aspects 1 through 13, wherein the measurement report indicates a distance measurement generated during the ranging procedure.

Aspect 15: The method of any of aspects 1 through 14, wherein the first wireless device is a neighbor awareness networking initiator device and the second wireless device is a neighbor awareness networking responder device.

Aspect 16: The method of aspect 15, wherein obtaining the measurement report comprises: transmitting an indication of the measurement report to the second wireless device using the secured ranging protocol.

Aspect 17: The method of any of aspects 1 through 14, wherein the second wireless device is a neighbor awareness networking initiator device and the first wireless device is a neighbor awareness networking responder device.

Aspect 18: The method of aspect 17, wherein obtaining the measurement report comprises: receiving an indication of the measurement report from the second wireless device using the secured ranging protocol.

Aspect 19: An apparatus for wireless communication at a first wireless device, comprising a processor, memory coupled with the processor, and instructions stored in the memory and executable by the processor to cause the apparatus to perform a method of any of aspects 1 through 18.

Aspect 20: An apparatus for wireless communication at a first wireless device, comprising at least one means for performing a method of any of aspects 1 through 18.

Aspect 21: A non-transitory computer-readable medium storing code for wireless communication at a first wireless device, the code comprising instructions executable by a processor to perform a method of any of aspects 1 through 18.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the wireless communications system 100 and the wireless communications system 200 described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
   establishing a communication session with a second wireless device using a neighbor awareness networking radio access technology;
   transmitting a first indication that the first wireless device is capable of using a secured ranging protocol;
   receiving a second indication that the second wireless device is capable of using the secured ranging protocol;
   determining one or more setup parameters to use for a ranging procedure between the first wireless device and the second wireless device based at least in part on the first indication and the second indication;
   obtaining a measurement report based at least in part on using the secured ranging protocol to perform the ranging procedure in accordance with the one or more setup parameters;
   wherein the one or more setup parameters comprise a bandwidth for the ranging procedure, a puncturing mode for the ranging procedure, a set of neighbor awareness networking further availability window slots for the ranging procedure, or a combination thereof; and
   wherein the bandwidth for the ranging procedure is 160 megahertz, 240 megahertz, or 320 megahertz.

2. The method of claim 1, wherein transmitting the first indication comprises:
   transmitting an indication of one or more ranging information element attributes within a service discovery frame, wherein the one or more ranging information element attributes comprise a ranging type field that indicates a capability of the first wireless device to use the secured ranging protocol.

3. The method of claim 1, wherein receiving the second indication comprises:
   receiving an indication of one or more ranging information element attributes within a service discovery frame, wherein the one or more ranging information element attributes comprise a ranging type field that indicates a capability of the second wireless device to use the secured ranging protocol.

4. The method of claim 1, further comprising:
   determining that the second wireless device is capable of using a default ranging protocol or the secured ranging protocol based at least in part on a value of a ranging type field signaled in a service discovery frame.

5. The method of claim 1, further comprising:
   determining the one or more setup parameters for the ranging procedure based at least in part on ranging capabilities of the first wireless device and the second wireless device; and
   performing the ranging procedure with the second wireless device using the one or more setup parameters.

6. The method of claim 5, wherein the ranging capabilities of the first wireless device and the second wireless device are signaled in a service discovery frame.

7. The method of claim 1, further comprising:
   exchanging messages with the second wireless device in a ranging setup request frame and a ranging setup response frame, wherein the messages indicate the one or more setup parameters for the ranging procedure.

8. The method of claim 1, wherein the one or more setup parameters for the ranging procedure are associated with the secured ranging protocol.

9. The method of claim 1, wherein the bandwidth for the ranging procedure is based at least in part on one or more device capability information elements signaled in a service discovery frame.

10. The method of claim 1, wherein the measurement report indicates a distance measurement generated during the ranging procedure.

11. The method of claim 1, wherein the first wireless device is a neighbor awareness networking initiator device and the second wireless device is a neighbor awareness networking responder device.

12. The method of claim 11, wherein obtaining the measurement report comprises:
    transmitting an indication of the measurement report to the second wireless device using the secured ranging protocol.

13. The method of claim 1, wherein the second wireless device is a neighbor awareness networking initiator device and the first wireless device is a neighbor awareness networking responder device.

14. The method of claim 13, wherein obtaining the measurement report comprises:
    receiving an indication of the measurement report from the second wireless device using the secured ranging protocol.

15. A method for wireless communication at a first wireless device, comprising:
    establishing a communication session with a second wireless device using a neighbor awareness networking radio access technology;
    transmitting a first indication that the first wireless device is capable of using a secured ranging protocol;
    receiving a second indication that the second wireless device is capable of using the secured ranging protocol;
    determining one or more setup parameters to use for a ranging procedure between the first wireless device and the second wireless device based at least in part on the first indication and the second indication;
    obtaining a measurement report based at least in part on using the secured ranging protocol to perform the ranging procedure in accordance with the one or more setup parameters;
    wherein the one or more setup parameters comprise a bandwidth for the ranging procedure, a puncturing mode for the ranging procedure, a set of neighbor awareness networking further availability window slots for the ranging procedure, or a combination thereof; and
    wherein the bandwidth for the ranging procedure is associated with an extra high throughput communication scheme or a high efficiency communication scheme.

16. A method for wireless communication at a first wireless device, comprising:
    establishing a communication session with a second wireless device using a neighbor awareness networking radio access technology;

transmitting a first indication that the first wireless device is capable of using a secured ranging protocol;

receiving a second indication that the second wireless device is capable of using the secured ranging protocol;

determining one or more setup parameters to use for a ranging procedure between the first wireless device and the second wireless device based at least in part on the first indication and the second indication;

obtaining a measurement report based at least in part on using the secured ranging protocol to perform the ranging procedure in accordance with the one or more setup parameters;

wherein the one or more setup parameters comprise a bandwidth for the ranging procedure, a puncturing mode for the ranging procedure, a set of neighbor awareness networking further availability window slots for the ranging procedure, or a combination thereof; and wherein the puncturing mode for the ranging procedure comprises a static puncturing mode or a dynamic puncturing mode.

17. An apparatus for wireless communication at a first wireless device, comprising:

a processor;

memory coupled with the processor; and instructions stored in the memory and executable by the processor to cause the apparatus to:

establish a communication session with a second wireless device using a neighbor awareness networking radio access technology;

transmit a first indication that the first wireless device is capable of using a secured ranging protocol;

receive a second indication that the second wireless device is capable of using the secured ranging protocol;

determine one or more setup parameters to use for a ranging procedure between the first wireless device and the second wireless device based at least in part on the first indication and the second indication;

obtain a measurement report based at least in part on using the secured ranging protocol to perform the ranging procedure in accordance with the one or more setup parameters;

wherein the one or more setup parameters comprise a bandwidth for the ranging procedure, a puncturing mode for the ranging procedure, a set of neighbor awareness networking further availability window slots for the ranging procedure, or a combination thereof; and wherein the bandwidth for the ranging procedure is 160 megahertz, 240 megahertz, or 320 megahertz.

18. The apparatus of claim 17, wherein the instructions to transmit the first indication are executable by the processor to cause the apparatus to:

transmit an indication of one or more ranging information element attributes within a service discovery frame, wherein the one or more ranging information element attributes comprise a ranging type field that indicates a capability of the first wireless device to use the secured ranging protocol.

19. The apparatus of claim 17, wherein the instructions to receive the second indication are executable by the processor to cause the apparatus to:

receive an indication of one or more ranging information element attributes within a service discovery frame, wherein the one or more ranging information element attributes comprise a ranging type field that indicates a capability of the second wireless device to use the secured ranging protocol.

20. The apparatus of claim 17, wherein the instructions are further executable by the processor to cause the apparatus to:

determine that the second wireless device is capable of using a default ranging protocol or the secured ranging protocol based at least in part on a value of a ranging type field signaled in a service discovery frame.

21. The apparatus of claim 17, wherein the instructions are further executable by the processor to cause the apparatus to:

determine the one or more setup parameters for the ranging procedure based at least in part on ranging capabilities of the first wireless device and the second wireless device; and perform the ranging procedure with the second wireless device using the one or more setup parameters.

22. The apparatus of claim 17, wherein the instructions are further executable by the processor to cause the apparatus to:

exchange messages with the second wireless device in a ranging setup request frame and a ranging setup response frame, wherein the messages indicate the one or more setup parameters for the ranging procedure.

23. The apparatus of claim 17, wherein the measurement report indicates a distance measurement generated during the ranging procedure.

24. An apparatus for wireless communication at a first wireless device, comprising:

a processor;

memory coupled with the processor; and instructions stored in the memory and executable by the processor to cause the apparatus to:

establish a communication session with a second wireless device using a neighbor awareness networking radio access technology;

transmit a first indication that the first wireless device is capable of using a secured ranging protocol;

receive a second indication that the second wireless device is capable of using the secured ranging protocol;

determine one or more setup parameters to use for a ranging procedure between the first wireless device and the second wireless device based at least in part on the first indication and the second indication;

obtain a measurement report based at least in part on using the secured ranging protocol to perform the ranging procedure in accordance with the one or more setup parameters;

wherein the one or more setup parameters comprise a bandwidth for the ranging procedure, a puncturing mode for the ranging procedure, a set of neighbor awareness networking further availability window slots for the ranging procedure, or a combination thereof; and wherein the bandwidth for the ranging procedure is associated with an extra high throughput communication scheme or a high efficiency communication scheme.

25. An apparatus for wireless communication at a first wireless device, comprising: means for establishing a communication session with a second wireless device using a neighbor awareness networking radio access technology; means for transmitting a first indication that the first wireless device is capable of using a secured ranging protocol; means for receiving a second indication that the second wireless device is capable of using the secured ranging protocol; means for determining one or more setup parameters to use for a ranging procedure between the first wireless device and the second wireless device based at least in part on the first indication and the second indication; means for obtaining a measurement report based at least in part on using the secured ranging protocol to perform the ranging procedure in accordance with the one or more setup parameters; wherein the one or more setup parameters comprise a bandwidth for the ranging procedure, a puncturing mode for the ranging procedure, a set of neighbor awareness networking further availability window slots for the ranging procedure, or a combination thereof; and wherein the bandwidth for the ranging procedure is 160 megahertz, 240 megahertz, or 320 megahertz.

26. A non-transitory computer-readable medium storing code for wireless communication at a first wireless device, the code comprising instructions that are executable by a processor to:

establish a communication session with a second wireless device using a neighbor awareness networking radio access technology;

transmit a first indication that the first wireless device is capable of using a secured ranging protocol;

receive a second indication that the second wireless device is capable of using the secured ranging protocol;

determine one or more setup parameters to use for a ranging procedure between the first wireless device and the second wireless device based at least in part on the first indication and the second indication;

obtain a measurement report based at least in part on using the secured ranging protocol to perform the ranging procedure in accordance with the one or more setup parameters;

wherein the one or more setup parameters comprise a bandwidth for the ranging procedure, a puncturing mode for the ranging procedure, a set of neighbor awareness networking further availability window slots for the ranging procedure, or a combination thereof; and wherein the bandwidth for the ranging procedure is 160 megahertz, 240 megahertz, or 320 megahertz.

* * * * *